United States Patent
Yamada et al.

(10) Patent No.: US 11,605,300 B2
(45) Date of Patent: Mar. 14, 2023

(54) AIRCRAFT OPERATION SYSTEM

(71) Applicant: NTT DOCOMO, INC., Tokyo (JP)

(72) Inventors: Takefumi Yamada, Tokyo (JP); Ken Koumoto, Tokyo (JP); Hidetoshi Ebara, Tokyo (JP); Youhei Oono, Tokyo (JP); Yuichiro Segawa, Tokyo (JP); Yukiko Nakamura, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 168 days.

(21) Appl. No.: 16/761,380

(22) PCT Filed: Oct. 30, 2018

(86) PCT No.: PCT/JP2018/040370
§ 371 (c)(1),
(2) Date: May 4, 2020

(87) PCT Pub. No.: WO2019/098016
PCT Pub. Date: May 23, 2019

(65) Prior Publication Data
US 2020/0365037 A1   Nov. 19, 2020

(30) Foreign Application Priority Data

Nov. 14, 2017  (JP) .............................. JP2017-218826

(51) Int. Cl.
*G08G 5/00*   (2006.01)
*G08G 5/04*   (2006.01)
(Continued)

(52) U.S. Cl.
CPC ......... *G08G 5/0013* (2013.01); *G05D 1/1064* (2019.05); *G08G 5/006* (2013.01);
(Continued)

(58) Field of Classification Search
CPC .... G08G 5/0021; G08G 5/045; G08G 5/0069; G08G 5/0043; G08G 5/0013;
(Continued)

(56) References Cited

U.S. PATENT DOCUMENTS

| | | | |
|---|---|---|---|
| 9,734,723 B1 * | 8/2017 | Bruno | G08G 5/0052 |
| 10,054,941 B1 * | 8/2018 | Beard | G08G 5/006 |

(Continued)

FOREIGN PATENT DOCUMENTS

| | | |
|---|---|---|
| JP | 2017062724 A | 3/2017 |
| WO | 2017051855 A1 | 3/2017 |
| WO | 2017115807 A1 | 7/2018 |

OTHER PUBLICATIONS

International Search Report issued in corresponding PCT Application No. PCT/JP2018/040370, dated Jan. 29, 2019, 2 pages.
(Continued)

*Primary Examiner* — Aniss Chad
*Assistant Examiner* — Madison R Hughes
(74) *Attorney, Agent, or Firm* — Dilworth IP, LLC

(57) ABSTRACT

Flight type determination unit determines a flight type of drone on the basis of parameters obtained by flight schedule obtainment unit. The flight type includes a travel type, which uses a destination as a parameter, a touring type, which uses a range in space (a touring range) as a parameter, and a hovering type, which uses a position in space (a hovering position) as a parameter. Allocation rule storage unit stores allocation rules for flight airspace corresponding to each of the plurality of flight types. Flight airspace allocation unit allocates flight airspace to drone on the basis of allocation rules corresponding to the flight type of that drone as indicated by the parameters obtained for that drone.

8 Claims, 11 Drawing Sheets

(51) Int. Cl.
  *G05D 1/10* (2006.01)
  *B64C 39/02* (2006.01)
  *B64F 1/36* (2017.01)
  *G01C 21/26* (2006.01)
  *G01C 21/34* (2006.01)
  *G01G 1/00* (2006.01)

(52) U.S. Cl.
  CPC ......... *G08G 5/0043* (2013.01); *G08G 5/0069* (2013.01); *G08G 5/045* (2013.01)

(58) Field of Classification Search
  CPC ........ G08G 5/0026; G08G 1/00; G08G 5/006; B64F 1/36; G05D 1/102; G05D 1/1064; G01C 21/26; G01C 21/34; B64C 39/02
  See application file for complete search history.

(56) References Cited

U.S. PATENT DOCUMENTS

| | | | |
|---|---|---|---|
| 2018/0253978 A1 | 9/2018 | Tabuchi | |
| 2018/0293898 A1* | 10/2018 | Redmann | G08G 5/006 |
| 2019/0272761 A1 | 9/2019 | Tabuchi | |
| 2019/0325756 A1* | 10/2019 | Cleaver | G08G 5/0078 |
| 2020/0250993 A1* | 8/2020 | Li | G08G 5/0091 |
| 2021/0097870 A1* | 4/2021 | Nakadai | G06Q 20/1235 |

OTHER PUBLICATIONS

Notice of Reasons for Refusal issued in corresponding Japanese Patent Application No. 2019-553798, dated Mar. 2, 2021.

* cited by examiner

| DRONE ID | TRAVEL TYPE | | | | TOURING TYPE | | HOVERING TYPE | |
|---|---|---|---|---|---|---|---|---|
| | DEPARTURE POINT | DESTINATION | ESTIMATED DEPARTURE TIME | ESTIMATED ARRIVAL TIME | TOURING RANGE | ESTIMATED TOURING PERIOD | HOVERING POSITION | ESTIMATED HOVERING PERIOD |
| D001 | WAREHOUSE a11 | STORE a12 | T11 | T12 | - | - | - | - |
| D002 | - | - | - | - | TOURING RANGE INFORMATION | T21''''-T22 | - | - |
| D003 | BASE a31 | VENUE a32 | T31 | T32 | - | - | - | - |
| | - | - | - | - | - | - | HOVERING POSITION INFORMATION | T32''''-T33 |
| | VENUE a32 | BASE a31 | T33 | T34 | - | - | - | - |

FIG. 6

| CELL ID | CENTER COORDINATES | LENGTH OF ONE SIDE | FLIGHT PERMISSION |
|---|---|---|---|
| C01_01 | x1,y1,z1 | L1 | ○ |
| C02_01 | x2,y1,z1 | L1 | ○ |
| ... | ... | ... | ... |
| C99_99 | x99,y99,z1 | L1 | × |

FIG. 7

| | TRAVEL TYPE | TOURING TYPE | HOVERING TYPE |
|---|---|---|---|
| TRAVEL TYPE | · MOVING IN SAME DIRECTION<br>· SHARE AIRSPACE IF AVOIDANCE FUNCTION PRESENT | · CANNOT SHARE AIRSPACE<br>· PRIORITIZE TOURING TYPE | · CANNOT SHARE AIRSPACE<br>· PRIORITIZE HOVERING TYPE |
| TOURING TYPE | · CANNOT SHARE AIRSPACE<br>· PRIORITIZE TOURING TYPE | · SHARE AIRSPACE IF AVOIDANCE FUNCTION PRESENT | · CANNOT SHARE AIRSPACE<br>· PRIORITIZE TOURING TYPE |
| HOVERING TYPE | · CANNOT SHARE AIRSPACE<br>· PRIORITIZE HOVERING TYPE | · CANNOT SHARE AIRSPACE<br>· PRIORITIZE TOURING TYPE | · CANNOT SHARE AIRSPACE<br>· PRIORITIZE EARLIER START FOR ESTIMATED HOVERING PERIOD |

FIG. 8

| DRONE ID | FLIGHT AIRSPACE (CELL ID) | FLIGHT PERMITTED PERIOD |
|---|---|---|
| D001 | R11(C0101,C0201,··,C2001) | K11(T111~T112) |
| | R12(C2001,C2002,··,C2020) | K12(T121~T122) |
| | R13(C2020,C2120,··,C4320) | K13(T131~T132) |
| D002 | A201(Cxxxx,··,Cxxxx) | T21~T22 |
| D003 | R31(C4005,C3905,··,C2005) | K31(T311~T312) |
| | R33(C2005,C2006,··,C2015) | K32(T321~T322) |
| | R33(C2015,C1915,··,C0515) | K33(T331~T332) |
| | R34(C0515,C0516,··,C0530) | K34(T341~T342) |
| | A301(C0530) | T32~T33 |
| | R34(C0530,C0529,··,C0515) | K35(T351~T352) |
| | ··· | ··· |
| | R31(C2005,C2105,··,C4005) | K38(T381~T382) |

| DESTINATION COORDINATES | FLIGHT ALTITUDE | FLIGHT DIRECTION | FLIGHT SPEED | SPATIAL WIDTH OF FLIGHT AIRSPACE | TARGET ARRIVAL TIME |
|---|---|---|---|---|---|
| P101 | 0~A1 | — | — | — | T111'~ |
| P102 | A1 | FACING EAST | V1 | L1,L1,L1 | T121'~T112' |
| P103 | | FACING SOUTH | V1 | L1,L1,L1 | T131'~T122' |
| P104 | | FACING EAST | V1 | L1,L1,L1 | ~T132' |
| P105 | A1~0 | — | — | — | — |

| SIZE OF TRAVEL AIRSPACE (CROSS-SECTIONAL AREA) | SIZE OF TOURING AIRSPACE (VOLUME) | NUMBER FOR WHICH SHARING IS POSSIBLE |
|---|---|---|
| LESS THAN E1 | – | 2 OR FEWER |
| GREATER THAN OR EQUAL TO E1 AND LESS THAN E2 | LESS THAN F1 | 4 OR FEWER |
| GREATER THAN OR EQUAL TO E2 | GREATER THAN OR EQUAL TO F1 AND LESS THAN F2 | 7 OR FEWER |
| – | GREATER THAN OR EQUAL TO F2 | 10 OR FEWER |

FIG. 14

| SIZE OF TOURING AIRSPACE (VOLUME) | PERCENTAGE OF DRONES HAVING AVOIDANCE FUNCTION |
|---|---|
| LESS THAN F1 | 100% |
| GREATER THAN OR EQUAL TO F1 AND LESS THAN F2 | 75% |
| GREATER THAN OR EQUAL TO F2 | 50% |

FIG. 15

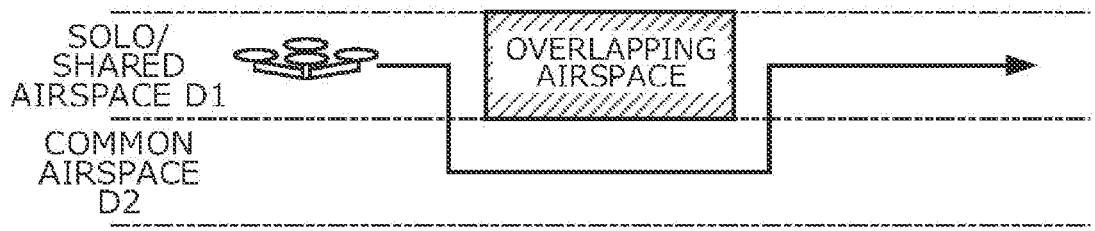
FIG. 16

US 11,605,300 B2

AIRCRAFT OPERATION SYSTEM

TECHNICAL FIELD

The present invention relates to a technique for allocating flight airspace to an aircraft.

BACKGROUND ART

Techniques for allocating flight airspace to an aircraft are known. For example, JP-2017-62724A discloses a technique that provides an air route along which an unmanned aircraft flies, the air route being located in a space higher than the tops of electrical wire poles with respect to the vertical direction and having a cross-sectional shape defined by a width determined on the basis of the shapes of the electrical wire poles.

SUMMARY OF INVENTION

As the use of aircraft such as drones becomes more common, flying such aircraft freely involves the risk of collisions with other aircraft. It is therefore conceivable to allocate flight airspace. However, because airspace is limited, it is necessary to use such airspace effectively.

Accordingly, an object of the present invention is to strike a balance between a reduction in the likelihood of collisions between aircraft and the effective use of airspace.

To achieve the above-described object, the present invention provides an information processing apparatus including: a storage unit that stores a flight airspace allocation rule associated with each of flight types, the flight types having different parameters used to determine flight airspace; an obtainment unit that obtains the parameters of flight airspace requested for an aircraft; and an allocation unit that allocates, to the aircraft, flight airspace based on the allocation rule associated with the flight type of the aircraft indicated by the parameters obtained for the aircraft.

The flight type may include a first type and a second type, the first type using a destination as the parameter, and the second type using a range in space as the parameter; and a rule that permits flight airspace to be shared with another aircraft having the same flight type may be associated with the first type and the second type as the allocation rule.

Furthermore, a rule that permits the flight airspace to be shared only between aircraft for which the flight airspace overlaps and which fly in the same direction may be associated with the first type as the allocation rule.

Additionally, a rule that permits overlapping flight airspace to be shared among a number of aircraft based on the size of the overlapping flight airspace may be associated with the first type and the second type as the allocation rule.

Furthermore, a rule that permits the flight airspace to be shared only by aircraft having a function for recognizing another aircraft and avoiding a collision may be associated with the first type and the second type as the allocation rule.

Additionally, a rule that permits flight airspace to be shared if a percentage of aircraft based on a size of the flight airspace has a function for recognizing another aircraft and avoiding a collision may be associated with the second type as the allocation rule.

Furthermore, a rule that sets a flight airspace allocation priority level higher for an aircraft having a function for recognizing another aircraft and avoiding a collision than for an aircraft not having the function may be associated with the first type and the second type as the allocation rule.

Additionally, the flight type may include a third type that uses a position in space as the parameter; and a rule that does not permit sharing of the space with the flight airspace of another aircraft may be associated with the third type as the allocation rule.

Furthermore, the allocation unit may allocate common airspace, which can be allocated regardless of the flight type, to the aircraft regardless of the allocation rule.

Additionally, the allocation unit may allocate the common airspace only to an aircraft having a function for recognizing another aircraft and avoiding a collision.

Advantageous Effects of Invention

According to the present invention, balance can be struck between a reduction in the likelihood of collisions between aircraft and the effective use of airspace when allocating flight airspace.

BRIEF DESCRIPTION OF DRAWINGS

FIG. 3 is a diagram illustrating the hardware configuration of a server apparatus and the like.

FIG. 6 is a diagram illustrating an example of generated flight schedule information.

FIG. 7 is a diagram illustrating an example of a flyable airspace table.

FIG. 8 is a diagram illustrating correlations among flight types defined by allocation rules.

FIG. 11 is a diagram illustrating an example of tentative determination information.

FIG. 14 is a diagram illustrating an example of a drone number table.

FIG. 15 is a diagram illustrating an example of a drone number table according to a variation.

FIG. 16 is a diagram illustrating an example of common airspace.

DETAILED DESCRIPTION

Embodiment

Figure 1:
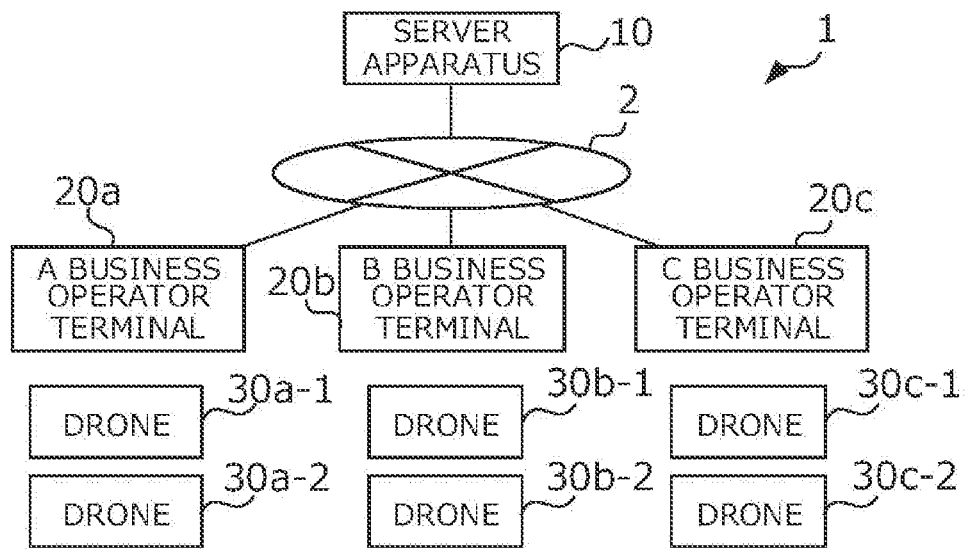
FIG. 1 is a diagram illustrating the overall configuration of a drone operation management system according to an embodiment.

FIG. 1 is a diagram illustrating the overall configuration of drone operation management system 1 according to an embodiment. Drone operation management system 1 is a system that manages operations of a drone. "Operation management" refers to managing flight of an aircraft such as a drone on the basis of a flight plan. In, for example, an environment in which multiple drones are flying, drone operation management system 1 supports the safe and smooth flight of the drones by allocating flight airspace to the drones and making instructions pertaining to the flight to the drones (flight instructions).

A "drone" is an aircraft that is capable of flying in accordance with a flight plan and that is typically unmanned, and is an example of an "aircraft" according to the present invention. Drones are mainly used by companies operating transport, filming, and surveillance businesses, for example. Although the present embodiment describes unmanned drones as the subject of the operation management, manned drones also exist, and manned drones may therefore also be subject to the operation management. Regardless of whether or not drone operation management system 1 handles manned aircraft, a scope of management for carrying out control in which the flight airspace of manned craft such as airplanes is ascertained and flight instructions or the like are issued may be included in the operation management carried out by drone operation management system 1.

Drone operation management system 1 includes network 2, server apparatus 10, A business operator terminal 20a, B business operator terminal 20b, C business operator terminal 20c (called "business operator terminals 20" when there is no need to distinguish between them), drones 30a-1 and 30a-2 of A business operator, drones 30b-1 and 30b-2 of B business operator, and drones 30c-1 and 30c-2 of C business operator (called "drones 30" when there is no need to distinguish between them).

Network 2 is a communication system including a mobile communication network, the Internet, and the like, and relays the exchange of data between devices accessing that system. Network 2 is accessed by server apparatus 10 and business operator terminals 20 through wired communication (or wireless communication), and by drones 30 through wireless communication.

Business operator terminals 20 are terminals used by, for example, operation managers of drones 30 in the respective businesses. Business operator terminals 20 generate flight schedules specifying overviews of flights planned by drones 30 through operations made by the operation managers, and transmit the generated flight schedules to server apparatus 10. Drones 30 flown by the business operators are classified into three flight types, namely a travel type, a touring type, and a hovering type, in the present embodiment. However, the flight type does not always need to be the same, and a single drone 30 may change its flight type depending on the purpose of usage, and may also change flight type midway through flight, as will be described later.

Figure 2:
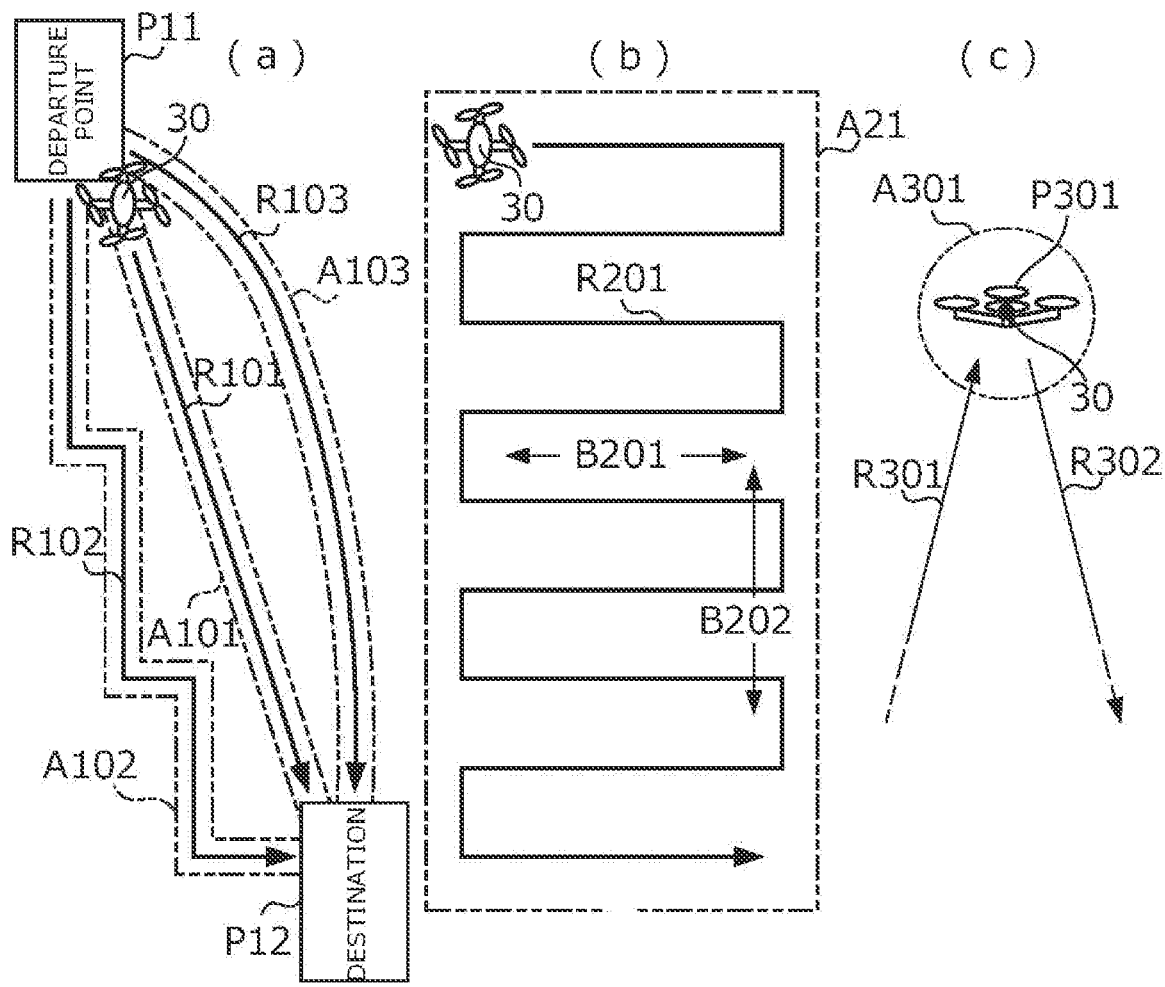
FIG. 2 is a diagram illustrating examples of flight types.

FIG. 2 is a diagram illustrating examples of flight types. FIG. 2(a) illustrates a travel type drone 30. The travel type drone 30 flies so as to move from departure point P11 to destination P12. The travel type is used for the purpose of transporting goods, for example. The travel type drone 30 uses a path that approaches destination P12 directly, as indicated by flight path R101 illustrated in FIG. 2(a), for example.

The travel type drone 30 also uses a path that approaches destination P12 by traversing linear paths as indicated by flight path R102, uses a path that approaches destination P12 by traversing curved paths as indicated by flight path R103, and so on. The travel type drone 30 may traverse both linear paths and curved paths. In any case, the travel type drone 30 basically travels toward destination P12.

However, when it necessary to avoid an obstacle or the like or traverse another designated point (a transit point), the travel type drone 30 may temporarily move away from destination P12. Travel airspace, which is airspace for traveling along the flight path as described above, is allocated to the travel type drone 30. In the example in FIG. 2(a), travel airspace A101 is allocated when flying along flight path R101, travel airspace A102 is allocated when flying along flight path R102, and travel airspace A103 is allocated when flying along flight path R103.

FIG. 2(b) illustrates a touring type drone 30. The touring type drone 30 is allocated touring airspace A201, which is a set amount of airspace, and flies throughout the range of touring airspace A201. The touring type is used for the purpose of filming, patrolling surveillance, distributing chemicals, and so on, for example. The touring type drone 30 flies throughout touring airspace A201 evenly by flying along flight path B201, in which drone 30 moves back and forth along a first direction B201, from one end to another end of touring airspace A201, while shifting the back-and-forth position slightly in a second direction B202 orthogonal to the first direction B201, for example, as illustrated in FIG. 2(b).

Note that flight path R201 is only an example, and a flight path that spirals toward the center of touring airspace A201, a flight path that spirals from the center toward the outside of touring airspace A201, or the like may be used instead. Additionally, a flight path in which drone 30 travels within touring airspace A201 at random, a flight path specified by the operation manager, or the like may be used as well. Furthermore, the flight path may have overlap so that the same path is traversed any number of times, such that there is uneven coverage within the touring airspace A201.

In any case, the touring type drone 30 flies within touring airspace A201, aside from situations of malfunction or other inevitable factors. The touring type drone 30 may start and stop flying within touring airspace A201, or outside of touring airspace A201. In the latter case, drone 30 functions as the travel type when flying outside touring airspace A201, and functions as the touring type when flying within touring airspace A201.

FIG. 2(c) illustrates a hovering type drone 30. The hovering type drone 30 stays still while flying at a specific position P31 in space, i.e., hovers. However, because it is difficult to actually come to a complete stop at position P31 (especially when outdoors), the hovering type drone 30 is allocated hovering airspace A301, which has a predetermined radius centered on position P31, for example, and flies so as not to depart hovering airspace A301.

The hovering type drone 30 flies as a travel type along outbound and inbound flight paths R301 and R302 to and from hovering airspace A301, and flies as a hovering type within hovering airspace A301. The flight schedule generated by business operator terminal 20 is information indicating parameters used to determine the flight airspace in accordance with the flight type of drone 30 that is to fly according to that flight schedule, among parameters such as the departure point, transit point, destination, touring range (filming range, surveillance range, chemical distribution range, or the like), hovering position, estimated departure time, estimated arrival time, estimated touring period, and estimated hovering period.

For example, in the case of the travel type, the departure point, the transit point, the destination, the estimated departure time, and the estimated arrival time are used as parameters. In the case of the touring type, the filming range, the surveillance range, or the chemical distribution range, and the estimated touring period, are used as the parameters. In the case of the hovering type, the hovering position and the estimated hovering period are used as parameters. In this manner, the travel type, the touring type, and the hovering type are flight types that use different parameters to determine the flight airspace.

Server apparatus 10 is an information processing apparatus that carries out processing pertaining to the flight schedule transmitted from business operator terminals 20. Server apparatus 10 allocates flight airspace to drone 30 on the basis of the received flight schedule. To be more specific, "allocating flight airspace" means allocating both flight airspace and a permitted flight period. Flight airspace is information indicating a space through which drone 30 is to pass when flying from a departure point to a destination (e.g., travel airspace A101, A102, and A103, touring airspace A201, and hovering airspace A301 illustrated in FIG. 2), and the permitted flight period is information indicating a period for which flight is permitted in the allocated flight airspace.

Server apparatus 10 creates flight instructions instructing drone 30 to fly in the allocated flight airspace for the allocation permitted flight period, and transmits the created flight instructions to business operator terminal 20. Business operator terminal 20 generates flight control information, which is an information set by which drone 30 controls its own flight, on the basis of the received flight instructions, and transmits the generated flight control information to the target drone 30. Although the information used by drone 30 to control the flight differs depending on the specifications of the program that controls drone 30, flight altitude, flight direction, flight speed, spatial coordinates of the point of arrival, and the like are used, for example.

Drone 30 is an aircraft that flies autonomously or according to a flight plan, and in the present embodiment, is a rotary-wing aircraft that includes one or more rotors and flies by rotating those rotors. All drones 30 include a coordinate measurement function for measuring the position and altitude of that drone 30 (i.e., spatial coordinates in a three-dimensional space) and a time measurement function for measuring time, and can fly within the flight airspace and permitted flight period specified by the flight instructions by controlling the flight speed and flight direction while measuring the spatial coordinates and the time.

Figure 3:
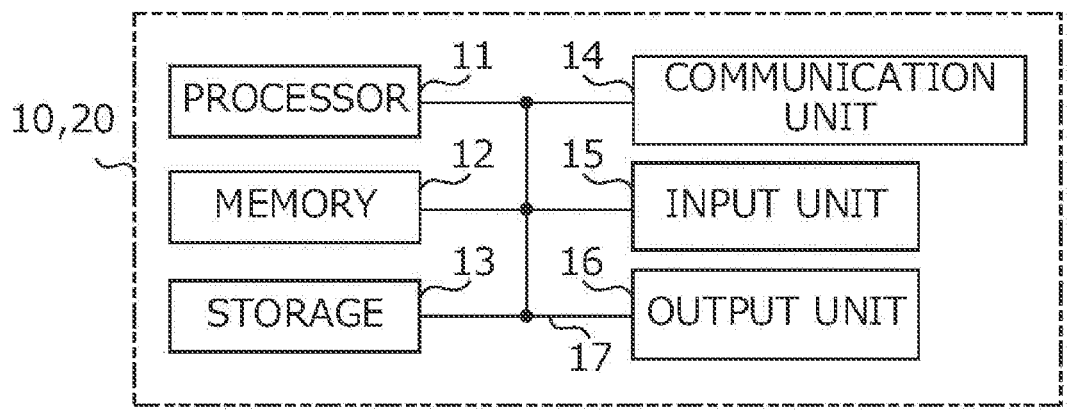

FIG. 3 is a diagram illustrating the hardware configuration of server apparatus 10 and the like. Server apparatus 10 and the like (server apparatus 10 and business operator terminal 20) are both computers that include the following apparatuses, namely processor 11, memory 12, storage 13, communication unit 14, input unit 15, output unit 16, and bus 17. The term "apparatus" used here can be replaced with "circuit", "device", "unit", or the like. One or more of each apparatus may be included, and some apparatuses may be omitted.

Processor 11 controls the computer as a whole by running an operating system, for example. Processor 11 may be constituted by a central processing unit (CPU) including an interface with peripheral apparatuses, a control apparatus, a computation apparatus, registers, and the like. Additionally, processor 11 reads out programs (program code), software modules, data, and the like from storage 13 and/or communication unit 14 into memory 12, and then executes various types of processes in accordance therewith.

There may be one, or two or more, processors 11 that execute the various types of processes, and two or more processors 11 may execute various types of processes simultaneously or sequentially. Processor 11 may be provided as one or more chips. The programs may be transmitted from a network over an electrical communication line.

Memory 12 is a computer-readable recording medium, and may be constituted by at least one of ROM (Read Only Memory), EPROM (Erasable Programmable ROM), EEPROM (Electrically Erasable Programmable ROM), RAM (Random Access Memory), and so on, for example. Memory 12 may be called a "register", "cache", "main memory" (a main storage apparatus), or the like. Memory 12 can store the aforementioned programs (program code), software modules, data, and the like.

Storage 13 is a computer-readable recording medium, and may be constituted by at least one of an optical disk such as a CD-ROM (Compact Disc ROM), a hard disk drive, a flexible disk, a magneto-optical disk (e.g., a compact disk, a digital versatile disk, or a Blu-ray (registered trademark) disk), a smartcard, flash memory (e.g., a card, a stick, or a key drive), a Floppy (registered trademark) disk, a magnetic strip, and the like.

Storage 13 may be called an auxiliary storage apparatus. The aforementioned storage medium may be a database, a server, or another appropriate medium including memory 12 and/or storage 13, for example. Communication unit 14 is hardware for communicating between computers over a wired and/or wireless network (a transmission/reception device), and is also called a network device, a network controller, a network card, a communication module, and the like, for example.

Input unit 15 is an input device that accepts inputs from the exterior (e.g., a keyboard, a mouse, a microphone, a switch, a button, a sensor, or the like). Output unit 16 is an output device that makes outputs to the exterior (e.g., a display, a speaker, or the like). Note that input unit 15 and output unit 16 may be configured integrally (e.g., a touchscreen). The apparatuses such as processor 11 and memory 12 can access each other over bus 17, which is used for communicating information. Bus 17 may be constituted by a single bus, or may be constituted by buses that differ among the apparatuses.

Figure 4:
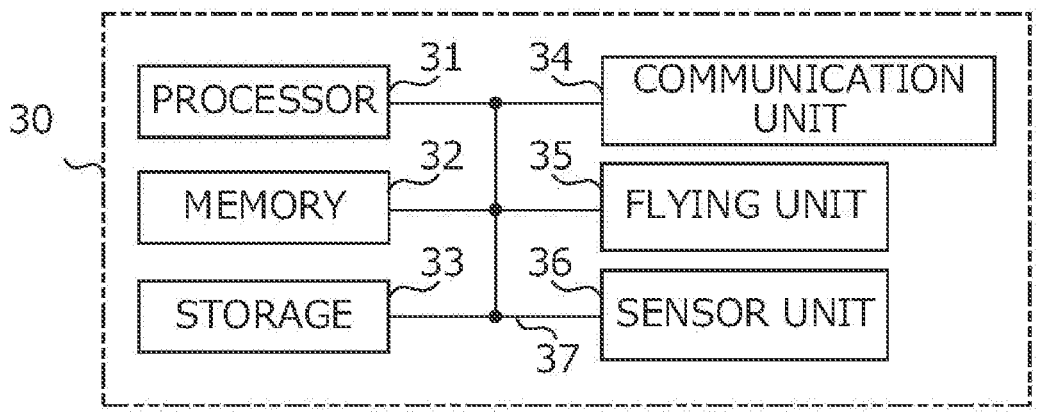
FIG. 4 is a diagram illustrating the hardware configuration of a drone.

FIG. 4 illustrates the hardware configuration of drone 30. Drone 30 is a computer including the following apparatuses, namely processor 31, memory 32, storage 33, communication unit 34, flying unit 35, sensor unit 36, and bus 37. The term "apparatus" used here can be replaced with "circuit", "device", "unit", or the like. One or more of each apparatus may be included, and some apparatuses may be omitted.

Processor 31, memory 32, storage 33, communication unit 34, and bus 37 are the same as the hardware of the same names illustrated in FIG. 2. Communication unit 34 can not only communicate wirelessly with the network 2, but can also implement wireless communication between drones 30. Flying unit 35 includes the aforementioned rotors and driving means such as a motor for rotating the rotors, and is an apparatus for causing the host device (drone 30) to fly. Flying unit 35 can move the host device in all directions, stop the host device (hovering), and the like while in the air.

Sensor unit 36 is an apparatus including a sensor group that obtains information necessary for flight control. Sensor unit 36 includes a position sensor that measures the position (latitude and longitude) of the host device, a direction sensor that measures the direction the host device is facing (a forward direction is defined for drone 30, and the forward direction is the direction the host device is facing), and an altitude sensor that measures the altitude of the host device. In the present embodiment, sensor units 36 of drones 30a-1, 30b-1, and 30c-1 include object recognition sensors that emit infrared light, millimeter waves, or the like and measure the distance to an object and the direction of the object on the basis of a time until reflected waves are received and the direction from which the reflected waves are received. Note that the object recognition sensor may be a sensor that includes an image sensor, a lens, and the like, and that recognizes an object by analyzing a captured image of the object.

On the other hand, sensor units 36 of drones 30a-2, 30b-2, and 30c-2 do not include object recognition sensors. The object recognition sensor is used for an avoidance function, in which the distance and direction of drone 30 relative to another drone 30 is measured, and when the other drone 30 has come within a predetermined distance, the flight direction is changed to a direction for avoiding that drone 30 in order to avoid a collision. In the present embodiment, drones 30a-1, 30b-1, and 30c-1 have the avoidance function, and drones 30a-2, 30b-2, and 30c-2 do not have the avoidance function.

Note that server apparatus 10, drones 30, and so on may be configured including hardware such as microprocessors, DSPs (Digital Signal Processors), ASICs (Application Specific Integrated Circuits), PLDs (Programmable Logic Devices), FPGA (Field Programmable Gate Arrays), and the like, and some or all of the function blocks may be realized by that hardware. For example, processor 11 may be provided as at least one of these types of hardware.

Server apparatus 10, business operator terminals 20, and drones 30 included in drone operation management system 1 store programs provided by the system, and implement the following group of functions by the processors included in the devices executing programs and controlling the various units.

Figure 5:
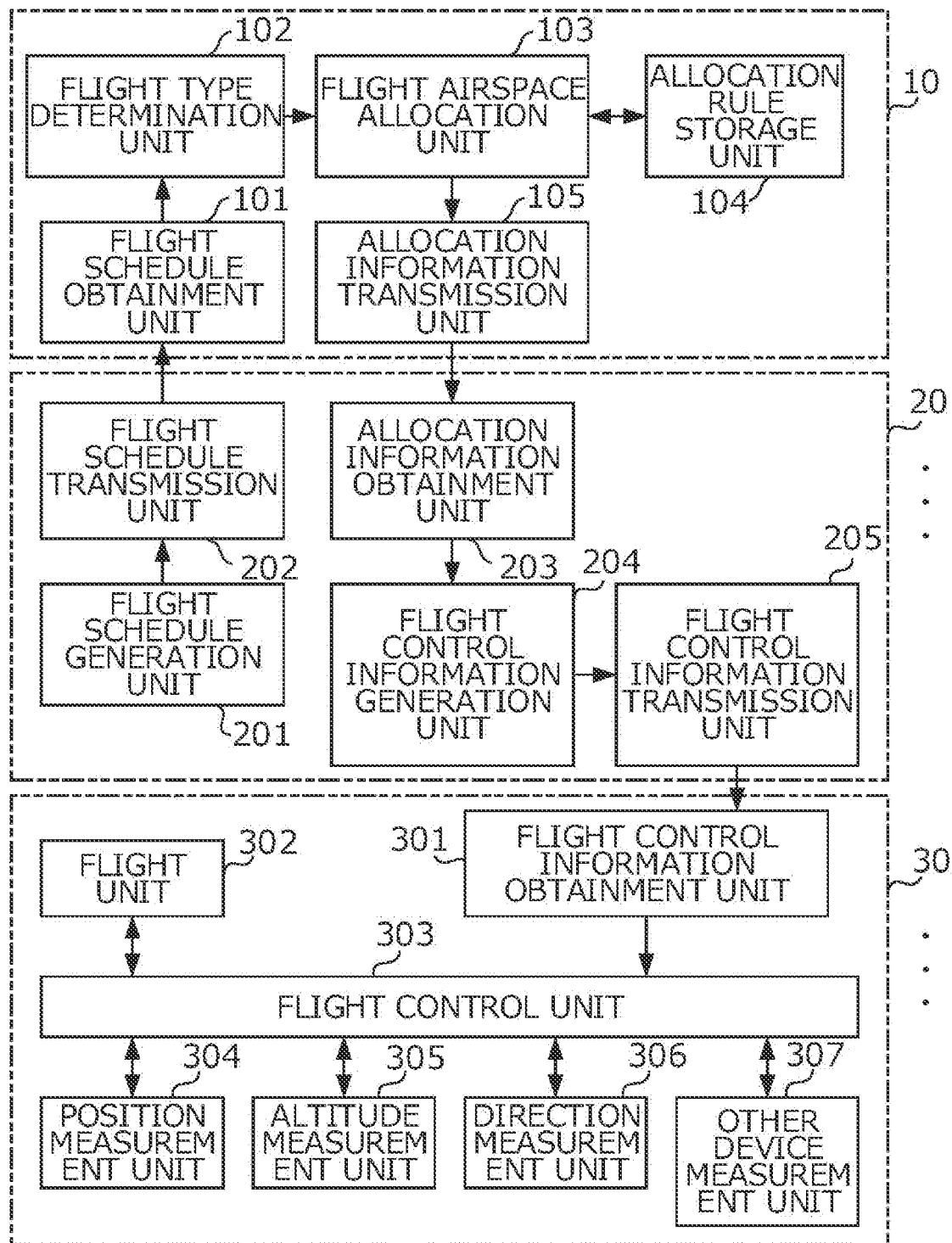
FIG. 5 is a diagram illustrating a functional configuration realized by the drone operation management system.

FIG. 5 illustrates a functional configuration realized by drone operation management system 1. Although only one each of business operator terminals 20 and drones 30 are illustrated in FIG. 5, the multiple business operator terminals 20 and multiple drones 30 all have the same functional configuration.

Server apparatus 10 includes flight schedule obtainment unit 101, flight type determination unit 102, flight airspace allocation unit 103, allocation rule storage unit 104, and allocation information transmission unit 105. Business operator terminal 20 includes flight schedule generation unit 201, flight schedule transmission unit 202, allocation information obtainment unit 203, flight control information generation unit 204, and flight control information transmission unit 205. Drone 30 includes flight control information obtainment unit 301, flight unit 302, flight control unit 303, position measurement unit 304, altitude measurement unit 305, direction measurement unit 306, and other device measurement unit 307. Note that drones 30a-2, 30b-2, and 30c-2 do not include other device measurement unit 307.

Flight schedule generation unit 201 of business operator terminal 20 generates the flight schedule information, which indicates the flight schedule of drone 30. Flight schedule generation unit 201 generates the flight schedule information on the basis of input information, upon the aforementioned operation manager inputting, to business operator terminal 20, a drone ID (identification) identifying drone 30 for which the flight schedule is to be input, and the aforementioned parameters (parameters used to determine the flight airspace based on the flight type), for example. Note that the flight schedule information is merely information indicating a flight schedule desired or requested by the business operator, and does not indicate a finalized flight plan.

FIG. 6 illustrates an example of the generated flight schedule information. In the example of FIG. 6, travel type parameters of "warehouse α11", "store α12", "T11", and "T12", which correspond to the departure point, destination, estimated departure time, and estimated arrival time, respectively, are associated with a drone ID of "D001", which identifies drone 30a-1 illustrated in FIG. 1. Touring type parameters of "touring range information" and "T21-T22", which correspond to the touring range and estimated touring period, are associated with a drone ID of "D002", which identifies drone 30b-1.

For example, if the touring range is expressed as the name of a segment, such as a specific place name or facility name (a segment name), the touring range information is information indicating that segment name. The touring range information is information that also expresses boundaries of the touring range with latitudes, longitudes, and altitudes, for example. For example, if the touring range is a parallelepiped space, the touring range information is expressed as latitudes, longitudes, and altitudes indicating the positions of the eight corners in space. In this example, the schedule has drone 30b-1 being carried to the touring airspace and flying only in the touring airspace.

Hovering type parameters of "hovering position information" and "T32-T33", which correspond to the hovering position and estimated hovering period, are associated with a drone ID of "D003", which identifies drone 30c-1. The hovering position information is information expressing the hovering position as latitude, longitude, and altitude, for example. Additionally, travel type parameters of "base α31", "venue α32", "T31", "T32", as well as "venue α32", "base α31", "T33", and "T34", which correspond to the departure point, destination, estimated departure time, and estimated arrival time, respectively, are associated with "D003".

In this example, the schedule has drone 30c-1 departing base α31, and upon reaching venue α32, hovering at venue α32, which is the hovering position. When the estimated hovering period then ends, drone 30c-1 departs venue α32 and travels to base α31. This flight schedule information is merely an example, and there are cases where transit points are present, the estimated departure time is not present, and so on, for example.

It is assumed that times such as "T11" actually express times in one-minute units, such as "9 hours 00 minutes". Note, however, that the time may be expressed at a finer level (e.g., in units of seconds), or at a broader level (e.g., in units of five minutes). Furthermore, although the date of the flight schedule may also be input, the present embodiment assumes that the operation manager inputs the flight schedule for that day on the morning of that day (i.e., that the date is unnecessary), to simplify the descriptions.

The flight schedule information of drone 30a-1 is generated by flight schedule generation unit 201 of A business operator terminal 20a. The flight schedule information of drone 30b-1 is generated by flight schedule generation unit 201 of B business operator terminal 20b, and the flight schedule information of drone 30c-1 is generated by flight schedule generation unit 201 of C business operator terminal 20c. Flight schedule generation unit 201 supplies the generated flight schedule information to flight schedule transmission unit 202. Flight schedule transmission unit 202 transmits the supplied flight schedule information to server apparatus 10. By transmitting the flight schedule information of drone 30, a request to allocate flight airspace and a permitted flight period to that drone 30 is made.

Flight schedule obtainment unit 101 of server apparatus 10 obtains the flight schedule information transmitted from each business operator terminal 20. As described above, the flight schedule information is information indicating the flight airspace parameters requested for drone 30. Flight schedule obtainment unit 101 obtains the parameters by obtaining the flight schedule information. Flight schedule obtainment unit 101 is an example of an "obtainment unit" according to the present invention.

Flight schedule obtainment unit 101 supplies the obtained flight schedule information to flight type determination unit 102. Flight type determination unit 102 determines the flight type of drone 30 on the basis of the parameters obtained by flight schedule obtainment unit 101. In the present embodiment, flight type determination unit 102 determines that drone 30 corresponds to a flight type when the specific parameters corresponding to that flight type have been obtained.

Specifically, the travel type is a flight type that takes the destination as the specific parameter, and is an example of a "first type" according to the present invention. The touring type is a flight type that takes a range in space (the touring range) as the specific parameter, and is an example of a "second type" according to the present invention. The hovering type is a flight type that takes a position in space (the hovering position) as the specific parameter, and is an example of a "third type" according to the present invention.

Accordingly, flight type determination unit 102 determines that the flight type is the travel type, if a destination has been obtained as a parameter; the touring type, if the touring range has been obtained as a parameter; and the hovering type, if the hovering position has been obtained as a parameter. Through this method, flight type determination unit 102 determines that drone 30a-1 is the travel type and drone 30b-1 is the touring type. Flight type determination unit 102 also determines that drone 30c-1 corresponds to two flight types, namely the travel type and the hovering type.

Flight type determination unit 102 supplies the flight type determination results to flight airspace allocation unit 103 along with the supplied flight schedule information. On the basis of the supplied flight schedule information and flight type determination results for drone 30, flight airspace allocation unit 103 allocates the flight airspace in which that drone 30 is to fly (a space through which drone 30 is to travel when flying from the departure point to the destination) and the permitted flight period (the period in which drone 30 is permitted to fly in that flight airspace) to that drone 30.

In drone operation management system 1, permitted flight airspace through which drones 30 can fly are determined in advance, in the same manner as a network of roads. The permitted flight airspace is of course airspace for which permission necessary for flight has been obtained, and may sometimes contain airspace for which permission is not needed. In the present embodiment, the permitted flight airspace is expressed as cubic spaces laid out without gaps therebetween (called "cells" hereinafter), and each cell is assigned a cell ID for identifying that cell.

Server apparatus 10 stores a flyable airspace table in which the cell ID, center coordinates of the cell, the length of one side of the cubic cell, and whether or not flight is permitted, are associated with each other.

FIG. 7 illustrates an example of the flyable airspace table. In the example of FIG. 7, cell IDs "C01_01", "C02_01", and so on up to "C99_99" are associated with center coordinates "x1,y1,z1", "x2,y1,z1", and so on up to "x99,y99,z99", respectively.

In the present embodiment, to simplify the descriptions, the cells have a constant altitude, and the xy coordinates of each cell are indicated as being associated with the cell ID (e.g., the cell having xy coordinates of (x10,y15) is given a cell ID of C10_15). In the example of FIG. 7, the lengths of the sides of each cell are all "L1". For whether or not flight is permitted, a circle indicates that flight is permitted, while an x indicates that flight is not permitted. For the travel type and the touring type, flight airspace allocation unit 103 allocates flight airspace (travel airspace and touring airspace) by allocating these cells.

Furthermore, flight airspace allocation unit 103 allocates flight airspace to drone 30 on the basis of allocation rules corresponding to the flight type determined by flight type determination unit 102, i.e., the flight type of that drone 30 as indicated by the parameters obtained for that drone 30. Flight airspace allocation unit 103 is an example of an "allocation unit" according to the present invention. Allocation rule storage unit 104 stores these allocation rules, i.e., the allocation rules for the flight airspace corresponding to each of the plurality of flight types. Allocation rule storage unit 104 is an example of a "storage unit" according to the present invention.

Allocation rule storage unit 104 stores the following allocation rules in the present embodiment.

<Travel Type Rules>

Allocation rule 1-1: flight airspace is shared with other drones 30 of the same flight type (i.e., drones 30 of the travel type) but not with drones 30 of different flight types.

Allocation rule 1-2: even if the flight types are the same, only drones 30 having overlapping flight airspace and that are flying in the same direction are allowed to share flight airspace.

Allocation rule 1-3: even if the flight types are the same, only drones 30 having the above-described avoidance function (the function for recognizing, and avoiding collisions with, other drones 30) are allowed to share flight airspace.

Allocation rule 1-4: if the flight airspace overlaps with that of another flight type, the allocation of the flight airspace for the other flight type is prioritized.

<Touring Type Rules>

Allocation rule 2-1: flight airspace is shared with other drones 30 of the same flight type (i.e., drones 30 of the touring type) but not with drones 30 of different flight types.

Allocation rule 2-2: even if the flight types are the same, only drones 30 having the above-described avoidance function (the function for recognizing, and avoiding collisions with, other drones 30) are allowed to share flight airspace.

Allocation rule 2-3: if the flight airspace overlaps with that of another flight type, the allocation of the flight airspace for that drone 30 itself is prioritized.

<Hovering Type Rules>

Allocation rule 3-1: the hovering position is not shared with the flight airspace of another drone 30.

Allocation rule 3-2: if the flight airspace overlaps with the travel type, the allocation of the flight airspace for that drone 30 itself is prioritized.

Allocation rule 3-3: if the flight airspace overlaps with the touring type, the allocation of the flight airspace for the touring type is prioritized.

Allocation rule 3-4: if the flight airspace overlaps with another hovering type, the allocation is prioritized for drone 30 having the earlier starting time for the estimated hovering period.

"Sharing flight airspace" means that the flight airspace at least partially overlaps for a plurality of drones 30, and the permitted flight periods at least partially overlap within the overlapping airspace, which is the stated overlapping flight airspace. In other words, flight airspace that overlap in terms of both space and time is called "shared flight airspace". For example, if the permitted flight period for drone 30a-1 in the overlapping airspace is from 1:00 to 1:10, and the permitted flight period for drone 30b-1 in the overlapping airspace is from 1:05 to 1:15, the permitted flight periods overlap for five minutes in the overlapping airspace, and drones 30a-1 and 30b-1 therefore share the overlapping airspace.

In the present embodiment, flight airspace allocation unit 103 tentatively determines the flight airspace to be assigned to each drone 30. At that time, there are cases where the flight airspace determined tentatively for different drones 30 partially or completely overlap. In this case, if the flight airspace (overlapping airspace) is to be shared on the basis of the allocation rules, the flight airspace of those drones 30 may be finalized as-is. However, if the flight airspace is not to be shared on the basis of the allocation rules, the flight airspace may be officially allocated having prioritized one of drones 30.

Overlapping flight airspace is not officially allocated to drone 30 that was not prioritized, and thus flight airspace allocation unit 103 revises the flight airspace allocated to that drone 30 (tentatively determines a different flight airspace). Flight airspace allocation unit 103 allocates flight airspace to each drone 30 for which allocation has been requested by repeating the tentative determination, revision, and finalization of the allocation in this manner.

The above-described allocation rules can be summarized in the following manner.

FIG. 8 illustrates correlations among flight types defined by allocation rules. For example, travel types share flight airspace if the travel is in the same direction and if the avoidance function is included. Touring types share flight airspace if the avoidance function is included. The flight airspace is shared only for these combinations, and flight airspace is not shared for other flight type combinations. If flight airspace overlaps between flight types of combinations for which flight airspace is not shared, the hovering type is prioritized over the travel type, and the touring type is prioritized over the hovering type (for multiple hovering types, the hovering type having the earlier start is prioritized).

Allocation rule storage unit 104 stores allocation rules 1-1 to 1-4 in association with the travel type; allocation rules 2-1 to 2-3, in association with the touring type; and allocation rules 3-1 to 3-4, in association with the hovering type. Upon being supplied with the determination result from flight type determination unit 102, flight airspace allocation unit 103 reads out, from allocation rule storage unit 104, the allocation rules stored in association with the flight types indicated by the determination result.

Flight airspace allocation unit 103 allocates flight airspace to drones 30 in accordance with the read-out allocation rules. First, flight airspace allocation unit 103 tentatively determines the flight airspace allocated to drone 30 through a method based on the flight type of drone 30 to which the flight airspace is to be allocated. For example, if drone 30 to which flight airspace is to be allocated is the travel type, flight airspace allocation unit 103 first identifies, from the cells in the permitted flight airspace, the cell that is closest to the departure point included in the flight schedule (a departure point cell) and the cell that is closest to the destination (a destination cell).

Then, flight airspace allocation unit 103 tentatively determines flight airspace that spans from the departure point cell to the destination cell identified from the cells in the permitted flight airspace, and that has the shortest flight distance, for example, and then extracts the cell IDs of the cells included in the tentatively-determined flight airspace.

Figure 9:
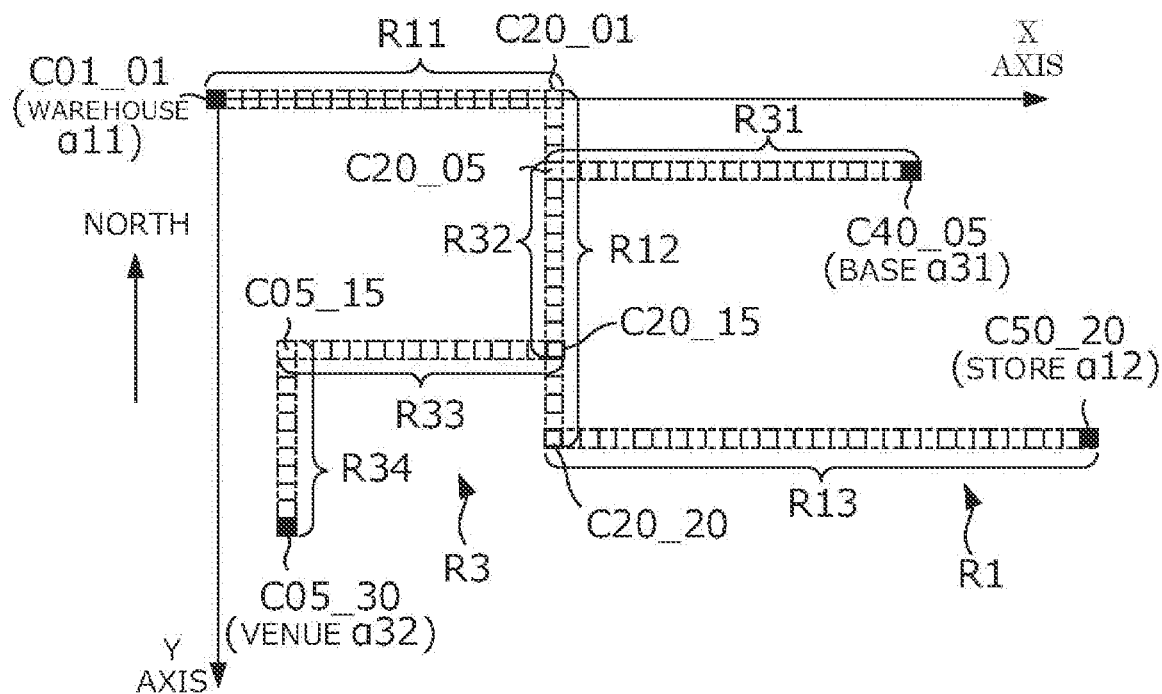
FIG. 9 is a diagram illustrating an example of tentatively-determined flight airspace.

FIG. 9 illustrates an example of the tentatively-determined flight airspace. FIG. 9 illustrates an x axis and a y axis that take the center of cell C01_01 (the cell with a cell ID of C01_01) as the origin, with the direction of the arrow on the x axis called the x axis positive direction, the direction opposite thereto called the x axis negative direction, the direction of the arrow on the y axis called the y axis positive direction, the direction opposite thereto called the y axis negative direction, and the y axis negative direction assumed to be north.

The example of FIG. 9 illustrates flight airspace R1 spanning from "warehouse α11" to "store α12" included in the flight schedule illustrated in FIG. 6. Flight airspace R1 includes: divided airspace (airspace obtained by dividing the flight airspace) R11 from cell C01_01, which is the departure point cell, through the cells adjacent in the x axis positive direction, and to cell C20_01; divided airspace R12 from cell C20_01, through the adjacent cells in the y axis positive direction, and to cell C20_20; and divided airspace R13 from cell C20_20, through the adjacent cells in the x axis positive direction, and to cell C50_20, which is the destination cell.

Additionally, the example of FIG. 9 illustrates flight airspace R3 spanning from "base α31" to "venue α32" included in the flight schedule illustrated in FIG. 6. Flight airspace R3 includes: divided airspace R31 from cell C40_05, which is the departure point cell, through the cells adjacent in the x axis negative direction, and to cell C20_05; divided airspace R32 from cell C20_05, through the adjacent cells in the y axis positive direction, and to cell C20_15; divided airspace R33 from cell C20_15, through the adjacent cells in the x axis negative direction, and to cell C05_15; and divided airspace R34 from cell C05_15, through the adjacent cells in the y axis positive direction, and to cell C05_30, which is the destination cell.

In the present embodiment, flight airspace allocation unit 103 tentatively determines the permitted flight period for each divided airspace. For example, flight airspace allocation unit 103 calculates a period obtained by dividing a period, from the estimated departure time to the estimated arrival time included in the flight schedule, according to a ratio based on the length of each divided airspace, as an airspace passage period required when passing through each divided airspace.

For example, if the ratio of the lengths of divided airspaces R11, R12, and R13 in flight airspace R1 is 2:2:3, and the period from the estimated departure time to the estimated arrival time is 70 minutes, flight airspace allocation unit 103 calculates 20 minutes:20 minutes:30 minutes as the airspace passage period for the divided airspaces. Flight airspace allocation unit 103 tentatively determines, as the permitted flight period in each divided airspace, a period that takes, as a start time or an end time, a time to which a margin period is added before and after times after which the airspace passage periods have passed in sequence following the estimated departure time (i.e., a time after the passage of 20 minutes, a time after the passage of 40 minutes, and a time after the passage of 70 minutes).

Figure 10:
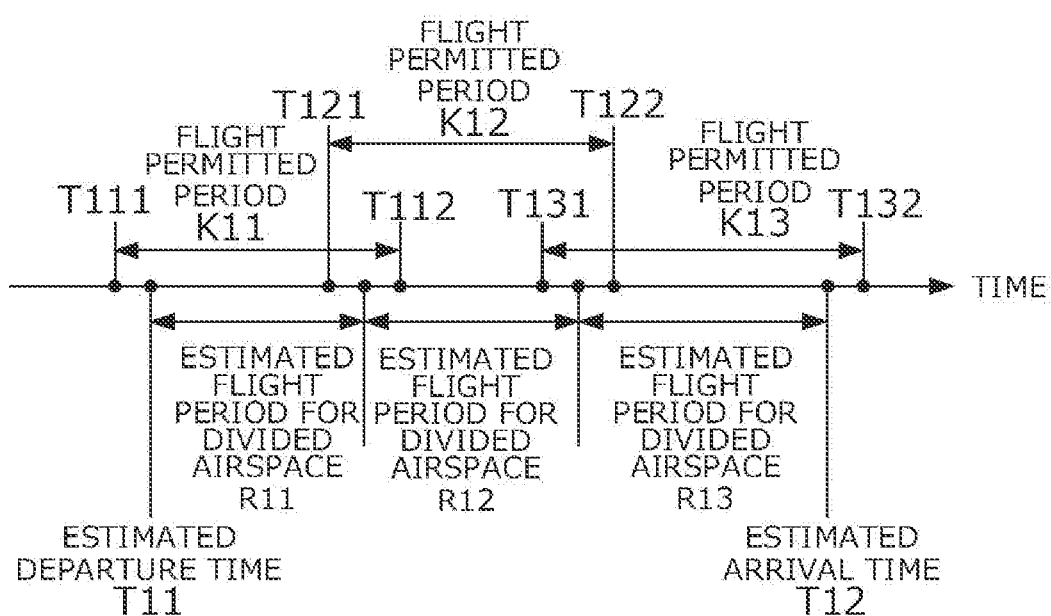
FIG. 10 is a diagram illustrating an example of tentatively-determined permitted flight periods.

FIG. 10 illustrates an example of tentatively-determined permitted flight periods. With respect to divided airspace R11, assuming the margin period is three minutes, for example, flight airspace allocation unit 103 tentatively determines, as the permitted flight period, period K11, which takes three minutes before estimated departure time T11 as start time T111, and takes a time when the margin period of three minutes has passed following the passage of the airspace passage period (20 minutes) for divided airspace R11 from estimated departure time T11 (i.e., 23 minutes after estimated departure time T1) as end time T112.

With respect to divided airspace R12, flight airspace allocation unit 103 tentatively determines, as the permitted flight period, period K12, which takes a time that is the margin period of three minutes before a time at which 20 minutes, which is the airspace passage period of divided airspace R11, has passed following estimated departure time T11 (i.e., 17 minutes after estimated departure time T1), as start time T121, and which takes a time at which the margin period of three minutes has passed after the passage of 40 minutes corresponding to the airspace passage periods in both divided airspaces R11 and R12 from estimated departure time T11 (i.e., 43 minutes after estimated departure time T1) as end time T122.

With respect to divided airspace R13, flight airspace allocation unit 103 tentatively determines, as the permitted flight period, period K13, which takes a time that is the margin period of three minutes before a time at which the 40 minutes corresponding to the airspace passage periods of both divided airspaces R11 and R12 have passed after estimated departure time T11 (i.e., 37 minutes after estimated departure time T1) as start time T131, and which takes a time at which the margin period of three minutes has passed after the passage of 70 minutes corresponding to the airspace passage periods of divided airspaces R11, R12, and R13 from estimated departure time T11 (i.e., 73 minutes after estimated departure time T1 or three minutes after estimated arrival time T2) as end time T132.

In the present embodiment, if drone 30 for allocation is the touring type, flight airspace allocation unit 103 tentatively determines a cell group included in the touring range as the flight airspace to be allocated to that drone 30. If drone 30 for allocation is the hovering type, flight airspace allocation unit 103 tentatively determines a cell included in the that hovering airspace as the flight airspace to be allocated to that drone 30. Flight airspace allocation unit 103 temporarily stores the information tentatively determined in this manner (tentative determination information).

FIG. 11 illustrates an example of the tentative determination information. In FIG. 11, the cell IDs of the cells included in the flight airspace are collected for each divided airspace, the corresponding permitted flight periods are associated with each divided airspace, and the flight airspaces and permitted flight periods are associated with the drone IDs of the tentatively-determined drone 30. For example, a cell ID group of the cells included in divided airspaces R11, R12, and R13, and the start times and end times of periods K11, K12, and K13, which are the permitted flight periods, are associated with the drone ID "D001" indicating the travel type drone 30a-1.

A cell ID group of the cells included in touring airspace A201, and an estimated touring period of T21-T22, are associated with the drone ID "D002" indicating the touring type drone 30b-1. Additionally, a cell ID group of cells, and permitted flight periods, in divided airspaces R31 to R34, the cell ID of a cell, and an estimated hovering period, in hovering airspace A301, and a cell ID group of cells, and permitted flight periods, in divided airspaces R34 to R31, are associated with the drone ID "D003" indicating the travel type and hovering type drone 30c-1.

Even if flight airspace overlaps at the tentative determination stage, flight airspace allocation unit 103 allocates all the flight airspace as-is, and it is therefore determined whether or not to allocate the flight airspace in an overlapping state, i.e., whether or not to share the flight airspace. Accordingly, first, flight airspace allocation unit 103 extracts combinations of drones 30 for which the tentatively-determined flight airspace overlaps. For the travel type, flight airspace allocation unit 103 calculates the airspace passage period required for passing through the entire flight airspace, and then divides the calculated airspace passage period according to the number of cells included in the flight airspace.

The divided periods express periods necessary for drone 30 to pass through each of the cells. Flight airspace allocation unit 103 calculates times, obtained by sequentially adding the divided periods to the estimated departure time, as a time at which drone 30 is estimated to start flying in a cell, and a time at which drone 30 is estimated to stop flying in the cell. Hereinafter, these start times and end times will be called "cell flight times". In the case of the touring type, it is not known when drone 30 will fly in cells within the touring airspace, and thus the start time and end time of the estimated touring period are used as the cell flight times for all of the cells.

In the case of the hovering type, drone 30 continually flies in the hovering airspace during the estimated hovering period, and thus the start time and end time of the estimated hovering period are used as the cell flight times for the tentatively-determined cells. In the present embodiment, if there are overlapping cells that have been tentatively determined to be allocated to two or more drones 30, and the difference between cell flight times for the overlapping cells is less than a threshold, flight airspace allocation unit 103 extracts the combination of those drones 30 as a combination of drones 30 for which the flight airspace overlaps.

For example, in the example of FIG. 9, the cells from cell C20_05 to cell C20_15 are tentatively-determined overlapping cells for which the allocation overlaps between drone 30a-1 and drone 30c-1. If the difference between the cell flight times of drones 30a-1 and 30c-1 in the overlapping cells is less than a threshold, flight airspace allocation unit 103 extracts the combination of drones 30a-1 and 30c-1 as a combination of drones 30 having overlapping flight airspace.

Although the example of FIG. 9 illustrates overlapping flight airspace between drones 30 of the travel type, combinations of drones 30 having overlapping flight airspace can be extracted using the same method for other flight types as well. Flight airspace allocation unit 103 determines whether or not the combination of drones 30 extracted in this manner is to share the overlapping flight airspace, in accordance with the allocation rules corresponding to the flight types of those drones 30.

For example, if the flight airspace of drones 30a-1 and 30b-1, i.e., the travel airspace and the touring airspace, overlap, the flight types are different from each other, and thus flight airspace allocation unit 103 determines that the airspace is not to be shared, in accordance with allocation rules 1-1 and 2-1. Additionally, flight airspace allocation unit 103 prioritizes the allocation of the touring airspace, in accordance with allocation rules 1-4 and 2-3. In other words, for the touring type drone 30b-1, flight airspace allocation unit 103 determines that the tentatively-determine flight airspace is to be officially allocated as-is.

On the other hand, for the travel type drone 30a-1, flight airspace allocation unit 103 withdraws the allocation of the tentatively-determined flight airspace, and instead allocates different flight airspace (also tentatively-determined), i.e., revises the flight airspace to be allocated. At this time, flight airspace allocation unit 103 allocates the new flight airspace from airspace aside from airspace for which the official allocation has been finalized. In this manner, flight airspace allocation unit 103 allocates flight airspace to each drone 30 by repeating the tentative determination, revision, and finalization of the allocation, as described above.

In addition to the above-described example, if, for example, the travel airspace of drone 30a-1 and the hovering airspace of drone 30c-1 overlap, flight airspace allocation unit 103 determines that the airspace is not to be shared, in accordance with allocation rules 1-1 and 3-1. Flight airspace allocation unit 103 prioritizes and finalizes the allocation of the hovering airspace in accordance with allocation rules 1-4 and 3-2, and revises the allocation of the travel airspace.

If, for example, the touring airspace of drone 30b-1 and the hovering airspace of drone 30c-1 overlap, flight airspace allocation unit 103 determines that the airspace is not to be shared, in accordance with allocation rules 2-1 and 3-1. Flight airspace allocation unit 103 prioritizes and finalizes the allocation of the touring airspace in accordance with allocation rules 2-3 and 3-3, and revises the allocation of the hovering airspace.

If the travel airspace of drone 30a-1 and the travel airspace of drone 30c-1 overlap, flight airspace allocation unit 103 determines that the flight airspace is to be shared in accordance with allocation rules 1-1, 1-2, and 1-3, if both are the travel type (allocation rule 1-1), if the travel directions are the same in the overlapping flight airspace (allocation rule 1-2), and if both have the avoidance function (allocation rule 1-3).

Although not indicated in the tentative determination information of FIG. 11, if the touring airspace of touring type drones 30 overlaps, flight airspace allocation unit 103 determines that the flight airspace is to be shared in accordance with allocation rules 2-1 and 2-2, if both have the avoidance function (allocation rule 2-2). If the hovering airspace of hovering type drones 30 overlap with each other, flight airspace allocation unit 103 determines that the flight airspace is not to be shared, in accordance with allocation rules 3-1 and 3-4, prioritizes and finalizes the allocation for drone 30 having the earlier start time for the estimated hovering period, and revises the allocation for drone 30 having the later start time.

Once the flight airspace allocations have been finalized for all drones 30 through the above-described method, flight airspace allocation unit 103 supplies the tentative determination information from the time of the finalization, as allocation information indicating the official flight airspace and permitted flight periods, to allocation information transmission unit 105. Allocation information transmission unit 105 transmits the supplied allocation information to business operator terminal 20 used by the operation manager of drone 30 having the drone ID included in that allocation information.

Because airspace is limited, if the number of drones 30 requesting airspace allocation is too high, a situation in which flight airspace cannot be allocated to some drones 30 may arise. In such a case, flight airspace allocation unit 103 includes information, which associates the drone ID of drone 30 for which it has been determined that airspace cannot be allocated with an indication that the allocation is not possible, in the allocation information so as to notify business operator terminal 20 that the allocation was not carried out. For that drone 30, the aforementioned operation manager inputs a new flight schedule and requests the allocation of flight airspace again, for example.

Allocation information obtainment unit 203 of business operator terminal 20 obtains the allocation information that has been transmitted and supplies that information to flight control information generation unit 204. Flight control information generation unit 204 generates the above-described flight control information (a group of information for drone 30 to control its own flight).

Figure 12:
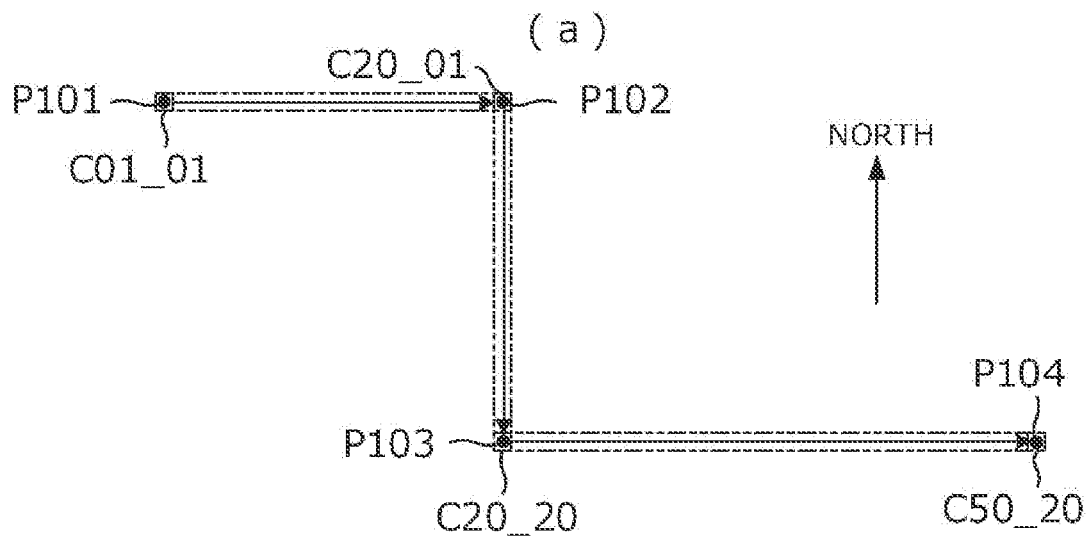
FIG. 12 is a diagram illustrating an example of generated flight control information.

FIG. 12 illustrates an example of the generated flight control information. FIG. 12 illustrates the flight control information for the above-described drone 30a-1.

As illustrated in FIG. 12(a), flight airspace from cell C01_01, which is the departure point cell, turning at cell C20_01 and cell C20_20, and then arriving at cell C50_20, which is the destination cell, is allocated to drone 30a-1. First, flight control information generation unit 204 calculates coordinates P101, P102, P103, and P104 of the center points of these four cells as target point coordinates (coordinates of target points to be arrived at next), and generates the flight control information including those coordinates.

In drone operation management system 1, a drone port where drone 30 can land is prepared at the point designated as the destination, and business operator terminal 20 stores the coordinates of each drone port in association with the name of the destination. In the example of FIG. 12, flight control information generation unit 204 adds coordinates P105 of the drone port associated with "store α12", which is the destination of drone 30a-1, to the flight control information as the target point coordinates.

Flight control information generation unit 204 adds, to the flight control information, the flight altitude, flight direction, flight speed, spatial width, and target arrival time when flying to each of the target point coordinates. As, for example, the flight altitude, flight control information generation unit 204 adds "0-A1" to the flight to coordinates P101 (takeoff); "A1", to the flight up to coordinates P104 following thereafter (horizontal flight); and "A1-0", to the flight up to coordinates P105 (landing).

Additionally, as the flight direction, flight control information generation unit 204 adds "facing east" from coordinates P101 to coordinates P102, "facing south" from coordinates P102 to coordinates P103, and "facing east" from coordinates P103 to coordinates P104, in which the horizontal flight is carried out. Furthermore, as the flight speed from P101 to P104, in which the horizontal flight is carried out, flight control information generation unit 204 adds an average speed V1 when flying in the flight airspace during a period from estimated departure time T11 to estimated arrival time T12 included in the flight schedule, for example.

Furthermore, flight control information generation unit 204 adds a length L1 of one side of the cell, as defined in the present embodiment, as the spatial width of the flight airspace from coordinates P101 to coordinates P104, in which the horizontal flight is carried out. The three spatial widths "L1, L1, L1" indicated in FIG. 12 refer to widths in three directions, namely the x axis direction, the y axis direction, and the z axis direction. The flight direction, flight speed, and spatial width are not needed during takeoff and landing and are therefore left blank.

Additionally, flight control information generation unit 204 adds a time using the estimated departure time T11 and estimated arrival time T12, and the start time and end time of the permitted flight period, as the target arrival time for each of the target point coordinates. For example, as the target arrival time for coordinates P101, flight control information generation unit 204 defines time T111', which follows, by a predetermined amount of time, start time T111 of period K11, which is the permitted flight period for divided airspace R11 starting from cell C01_01 that includes coordinates P101.

Entering cell C01_01 before start time T111 corresponds to entry prior to period K11, which is the permitted flight period, and thus time T111' expresses a time that has passed following start time T111 by an amount of time longer than the amount of time required to arrive at coordinates P101 after entering cell C01_01. Arriving after time T111' corresponds to entering divided airspace R11 once in period K11, which is the permitted flight period.

Additionally, as the target arrival time for coordinates P102, which correspond to the boundary between divided airspaces R11 and R12, flight control information generation unit 204 defines a time from time T121', which follows, by a predetermined amount of time, start time T121 of the permitted flight period of divided airspace R12 starting from cell C20_01 that includes coordinates P102, to time T112', which precedes, by a predetermined amount of time, end time T112 of the permitted flight period of divided airspace R11 that ends at cell C20_01.

Like time T111', arriving at coordinates P102 after time T121' corresponds to entering divided airspace R12 once in period K12, which is the permitted flight period. It is assumed that time T112' expresses a time that has passed following end time T112 by an amount of time longer than the amount of time required to exit cell C20_01 from coordinates P102. Arriving at coordinates P102 before time T112' means that if the flight is continued, divided airspace R11 can be exited before period K11, which is the permitted flight period, ends. The target arrival time at coordinates P103, which corresponds to the boundary between divided airspaces R12 and R13, is determined through the same method.

As the target arrival time at coordinates P104, flight control information generation unit 204 defines a time before time T132', which precedes, by a predetermined amount of time, end time T132 of period K13, which is the permitted flight period of divided airspace R13 that ends at cell C50_20 including coordinates P104. Arriving at coordinates P104 before time T132' means that if the flight is continued, divided airspace R13 can be exited before period K13, which is the permitted flight period, ends. Flight control information generation unit 204 supplies the flight control information generated in this manner to flight control information transmission unit 205.

Flight control information transmission unit 205 transmits the supplied flight control information to the target drone 30. Flight control information obtainment unit 301 of drone 30 obtains the flight control information that has been transmitted and supplies the obtained flight control information to flight control unit 303. Flight unit 302 is a function for causing the host device (that drone) to fly. In the present embodiment, flight unit 302 causes the host device to fly using the rotors, driving means, and so on included in flying unit 35.

Flight control unit 303 controls flight unit 302 on the basis of the flight control information supplied from flight control information obtainment unit 301, and carries out a flight control process of controlling the flight of the host device. Position measurement unit 304 measures the position of the host device, and supplies position information indicating the measured position (e.g., latitude/longitude information) to flight control unit 303. Altitude measurement unit 305 measures the altitude of the host device, and supplies altitude information indicating the measured altitude (e.g., information indicating the altitude in cm) to flight control unit 303.

Direction measurement unit 306 measures the direction in which the front of the host device is facing, and supplies direction information indicating the measured direction (e.g., when true north is taken as 0 degrees, information indicating an angle to 360 degrees from each direction) to flight control unit 303. Other device measurement unit 307 uses the object recognition sensor included in sensor unit 36 to measure the distance between another drone 30, which is present in the periphery of the host device, to the host device, and the direction of that drone 30, and supplies other drone information indicating the measured distance and direction to flight control unit 303. The position information, altitude information, direction information, and other drone information described above are repeatedly supplied to flight control unit 303 every predetermined interval of time (e.g., every one second).

Flight control unit 303 controls the flight of the host device on the basis of the repeatedly-supplied position information, altitude information, and direction information, as well as the other drone information when drone 30 includes other device measurement unit 307, in addition to the above-described flight control information. Flight control unit 303 controls the altitude of the host device so that the measured altitude remains at the flight altitude indicated by the flight control information, for example (altitude control). Flight control unit 303 also controls the flight speed of the host device so that changes in the measured position, i.e., the speed, remains at the flight speed indicated by the flight control information (speed control).

Flight control unit 303 also controls the flight altitude and the flight direction so that the host device stays within a quadrangular (square, in the present embodiment) range centered on coordinates of a line connecting the previous target point coordinates with the next target point coordinates (airspace passage control). This quadrangle expresses the boundaries of the flight airspace, corresponds to cross-section when the flight airspace is segmented by a plane orthogonal to the travel direction, and has a length on one side corresponding to the spatial width of the flight airspace.

Flight control unit 303 controls the host device on the basis of the measured position and altitude, and the dimensions of the host device (vertical dimensions and horizontal dimensions) so that the host device stays within the quadrangular range. When the target point coordinates approach, flight control unit 303 controls the flight speed so as to reduce the flight speed if the arrival will be before the target arrival time and increase the flight speed if the arrival will be after the target arrival time (arrival control).

If the host device includes other device measurement unit 307, and the measured distance to the other drone has fallen below a threshold, flight control unit 303 avoids a collision with the other drone that has approached by changing the flight direction to a direction based on the direction of the other drone measured at that time, changing the flight speed, or the like. In this case, flight control unit 303 functions as an "avoidance function" according to the present invention. Using, for example, typical aircraft rules, flight control unit 303 makes evasive maneuvers such as changing the flight direction to the right when the other drone is approaching from the front or at an angle close thereto, reducing flight speed and yielding the path when the other drone is approaching from the right side, and the like.

On the basis of the configuration described above, the apparatuses included in drone operation management system 1 carries out an allocation process for allocating flight airspace and permitted flight periods to drones 30.

Figure 13:
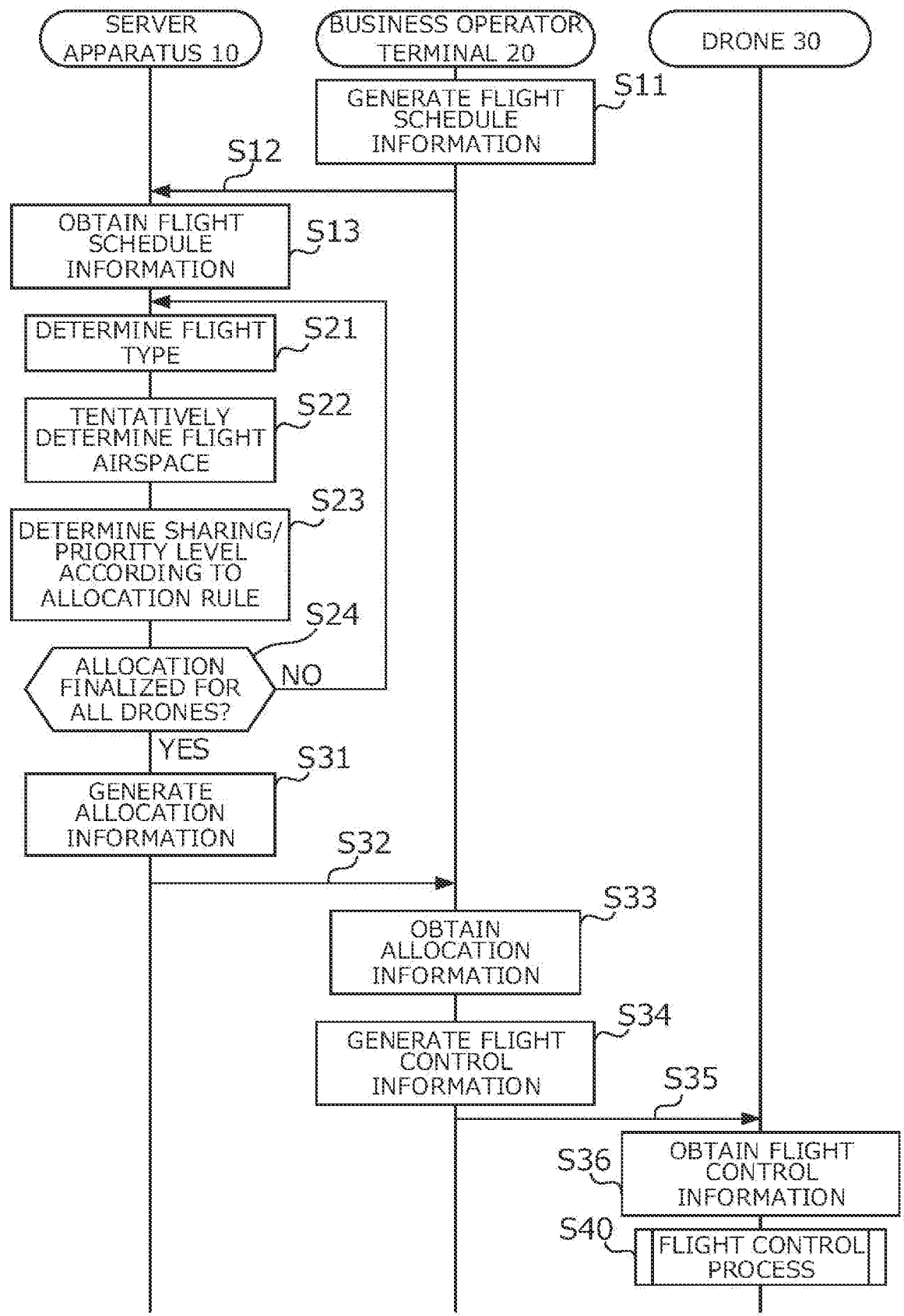
FIG. 13 is a diagram illustrating an example of operation sequences carried out by apparatuses in an allocation process.

FIG. 13 illustrates an example of operation sequences carried out by the apparatuses in the allocation process. This operation sequence is started upon an operator of drone 30 inputting the flight schedule into business operator terminal 20, for example. First, business operator terminal 20 (flight schedule generation unit 201) generates the flight schedule information as illustrated in FIG. 6 (step S11).

Next, business operator terminal 20 (flight schedule transmission unit 202) transmits the generated flight schedule information to server apparatus 10 (step S12). Server apparatus 10 (flight schedule obtainment unit 101) obtains the flight schedule information transmitted from business operator terminal 20 (step S13). Then, server apparatus 10 (flight type determination unit 102) determines the flight type of drone 30 for which the flight schedule is indicated by the obtained flight schedule information (step S21).

Next, server apparatus 10 (flight airspace allocation unit 103) tentatively determines the flight airspace on the basis of the obtained flight schedule information (step S22), and furthermore determines, in accordance with the allocation rules corresponding to the determined flight type, whether or not to share overlapping flight airspace, as well as a priority level for allocation if the overlapping flight airspace is not to be shared (step S23). Then, server apparatus 10 determines whether or not the allocation has been finalized for all drones 30 (step S24), and carries out the processing from step S21 again if it is determined that the allocation has not been finalized (NO).

If it is determined in step S24 that the allocation is finalized (YES), server apparatus 10 (flight airspace allocation unit 103) generates the allocation information as indicated in FIG. 11, in which the tentatively-determined flight airspace and permitted flight periods are finalized as official (step S31), and transmits the generated allocation information to business operator terminal 20 (step S32). Business operator terminal 20 (allocation information obtainment unit 203) obtains the transmitted allocation information (step S33).

Next, business operator terminal 20 (flight control information generation unit 204) generates the flight control information as illustrated in FIG. 12 on the basis of the obtained allocation information (step S34). Business operator terminal 20 (flight control information transmission unit 205) transmits the generated flight control information to the target drone 30 (step S35). Drone 30 (flight control information obtainment unit 301) obtains the transmitted flight control information (step S36). Drone 30 carries out the above-described flight control processing on the basis of the obtained flight control information (step S40).

When allocating flight airspace to drones 30, allocating each drone 30 different flight airspace eliminates the risk of collisions and is therefore safe. However, airspace is limited, and if there is overlap in the flight airspace, flight airspace that is different from that requested will often be allocated unless all airspace is accepted as being shared, which reduces the convenience for the party requesting the allocation. In the present embodiment, sharing of flight airspace is, depending on the flight type, permitted according to the allocation rules corresponding to the flight types described above, and thus when allocating the flight airspace, balance can be struck between reducing the likelihood of collisions between drones (between aircraft) and using airspace effectively.

For example, in a combination of travel types, both drones 30 are flying toward the destination, and thus even if the drones 30 approach each other, this only happens once, and the drones 30 often move apart after the stated approach. Thus in the present embodiment, the effective use of airspace is encouraged by permitting sharing for travel types. However, the sharing is not always permitted, and in the present embodiment, the likelihood of collisions is reduced by permitting sharing only when drones 30 move in the same direction in overlapping cells and both have the avoidance function, as compared to when permitting sharing for other cases than these cases.

With respect to a combination of a travel type and a touring type, the touring type changes its travel direction in a variety of ways, and it is therefore possible that drones 30 will approach each other any number of times after the first approach. Thus in the present embodiment, sharing is not permitted for this combination, which reduces the likelihood of collisions as compared to a case where sharing is permitted for this combination. On the other hand, with a combination of touring types, although it is possible that drones 30 will approach each other any number of times after the first approach, the touring airspace is often broader than the travel airspace, and thus the drones will not approach each other frequently.

Thus in the present embodiment, the effective use of airspace is encouraged by permitting sharing for touring types. However, in this case too, sharing is permitted only when drones 30 have the avoidance function, which reduces the likelihood of collisions as compared to a case where sharing is permitting in other cases than that case. The hovering airspace allocated to the hovering type is extremely small compared to the travel airspace and the touring airspace, and thus airspace will not be wasted even if sharing is not permitted. Thus for the hovering type, reducing the likelihood of collisions is prioritized by not permitting sharing of airspace regardless of the flight type of the other drone.

If touring airspace is changed, the objective of the flight (filming, surveillance, chemical distribution, and so on) often cannot be achieved, whereas travel airspace may be changed without issue as long as the drone can reach the destination. In the present embodiment, giving the touring airspace the highest level of priority prevents a situation where a touring type drone 30 has its airspace changed and cannot achieve its flight objective as a result.

2. Variations

The above-described embodiment is merely one example for carrying out the present invention, and the following variations are possible as well.

2-1. Flight Airspace

In the embodiment, flight airspace allocation unit 103 allocated the flight airspace using cubic cells, but the flight airspace may be allocated using a different method. For example, flight airspace allocation unit 103 may use parallelepiped cells instead of cubic cells, or may arrange cylindrical cells with their axes following the travel direction and use those cells as the flight airspace. Instead of cells, flight airspace allocation unit 103 may allocate flight airspace by expressing points, lines, and planes serving as the boundaries of the flight airspace through equations and ranges of spatial coordinates.

Additionally, in the embodiment, flight airspace allocation unit 103 allocates flight airspace including only cells of a constant height, as indicated in FIG. 7. However, flight airspace including cells of different heights (flight airspace including movement in the vertical direction) may be allocated as well. Furthermore, in the embodiment, flight airspace allocation unit 103 allocates flight airspace that uses east, west, south, and north as the travel directions. However, flight airspace that uses other directions (north-northeast, west-southwest, and so on) as travel directions may be allocated, and flight airspace including angular climbs and descents may be allocated as well. In sum, flight airspace allocation unit 103 may allocate any airspace as the flight airspace as long as it is airspace in which drone 30 can fly.

2-2. Limits on Number of Drones for Sharing

In the embodiment, depending on the flight type, flight airspace is shared even if that flight airspace overlaps. However, the number of drones that share the flight airspace may be limited if the number of drones 30 for which the flight airspace overlaps increases. In the present variation, allocation rule storage unit 104 stores the following allocation rules in association with the travel type and the touring type.

<Travel Type Rule>

Allocation rule 1-5: travel airspace can be shared by a number of drones 30 based on the size of the overlapping flight airspace (travel airspace).

<Touring Type Rule>

Allocation rule 2-4: touring airspace can be shared by a number of drones 30 based on the size of the overlapping flight airspace (touring airspace).

In the case of the travel type, the area of a cross-section of the travel airspace (a plane orthogonal to the travel direction) is used as the size of the travel airspace, for example. In the present variation, it is assumed that the size of the cells differs from location to location, and thus the cross-sectional area differs as well. For example, small cells are used in locations close to city centers, whereas large cells are used in locations close to rivers, mountainous areas, and the like. In the case of the touring type, the volume of the touring airspace is used as the size of the touring airspace, for example.

Flight airspace allocation unit 103 stores the volume and cross-sectional area of each cell, as well as a drone number table in which the size of the travel airspace, the size of the touring airspace, and the number of drones for which sharing is possible are associated with each other, and allocates flight airspace using that drone number table.

FIG. 14 illustrates an example of the drone number table. In the example of FIG. 14, if the size (cross-sectional area) of the travel airspace is "less than E1", the number of drones that can share the airspace is "2 or fewer"; if the size is "greater than or equal to E1 and less than E2", the number is "4 or fewer"; and if the size is "greater than or equal to E2", the number is "7 or fewer".

If the size (volume) of the touring airspace is "less than F1", the number of drones that can share the airspace is "4 or fewer"; if the size is "greater than or equal to F1 and less than F2", the number is "7 or fewer"; and if the size is "greater than or equal to F2", the number is "10 or fewer". In the case of the travel type, flight airspace allocation unit 103 calculates the cross-sectional area of the cells included in the flight airspace, among the tentatively-determined flight airspace, that overlaps, and permits drones 30 to share the travel airspace up to the number of drones associated with the calculated cross-sectional area. Note that if the cross-sectional area of the cells changes midway through, a statistical representative value, such as an average value, may be calculated.

In the case of the touring type, flight airspace allocation unit 103 calculates the total volume of all the cells included in the flight airspace, among the tentatively-determined flight airspace, that overlaps, and permits drones 30 to share the touring airspace up to the number of drones associated with the calculated volume. If the number of drones 30 for which the flight airspace overlaps is higher than the number of drones that can share airspace, flight airspace allocation unit 103 finalizes the flight airspace having prioritized the drone for which the start time of the permitted flight period is earliest, for example. The configuration is not limited thereto, however, and the drone for which the permitted flight period is longest may be prioritized, for example.

As the overlapping flight airspace becomes smaller, it is more likely that a collision will occur when multiple drones 30 that share that flight airspace are flying. In the present variation, the number of drones 30 permitted to share airspace is reduced as the overlapping flight airspace becomes narrower, which reduces the likelihood of a collision as compared to a case where the number of drones that can share airspace is not limited.

2-3. Avoidance Function Percentage

In the embodiment, allocation rules are used in which flight airspace is permitted to be shared when drones 30 have the avoidance function. However, with a large flight airspace such as the touring airspace, an allocation rule may be used in which the flight airspace is shared even if all drones 30 do not have the avoidance function, as long as some drones 30 have the avoidance function.

In the present variation, allocation rule storage unit 104 stores the following allocation rules in association with the touring type.

<Touring Type Rule>

Allocation rule 2-5: travel airspace can be shared as long as a percentage of drones 30, based on the size of the overlapping flight airspace (touring airspace), has the avoidance function.

Flight airspace allocation unit 103 stores a drone number table in which sizes of the touring airspace are associated with percentages of drones having the avoidance function, and allocates the flight airspace using that drone number table.

FIG. 15 illustrates an example of a drone number table according to the present variation. In the example of FIG. 15, if the size (volume) of the touring airspace is "less than F1", the percentage of drones having the avoidance function is "100%"; if the size is "greater than or equal to F1 and less than F2", the percentage is "75%"; and if the size is "greater than or equal to F2", the percentage is "50%".

In the case of the touring type, flight airspace allocation unit 103 calculates the total volume of all cells included in the touring airspace, among the tentatively-determined touring airspace, that overlaps, and reads out the percentage associated with the calculated volume. For example, if the touring airspace of four drones 30 overlaps completely and the volume thereof is greater than or equal to F2, flight airspace allocation unit 103 reads out the percentage of "50%". In this case, flight airspace allocation unit 103 permits the four drones 30 to share the overlapping touring airspace as long as two of the four drones 30 have the avoidance function.

If one of the four drones 30 has the avoidance function, flight airspace allocation unit 103 permits two of the drones 30 which, among the four drones 30, have the avoidance function, to share the overlapping touring airspace, and revises the allocation for the remaining two drones 30. In this manner, flight airspace allocation unit 103 limits the number of drones so that the percentage of drones 30 having the avoidance function follows the allocation rule. In this case, the revision may be carried out in the same manner as in the above-described variation.

As the overlapping flight airspace becomes larger, it is less likely that a collision will occur when multiple drones 30 that share that flight airspace are flying. In the present variation, even if only a small percentage of the drones 30 have the avoidance function, a greater number of drones are permitted to share the flight airspace as the overlapping flight airspace becomes larger. Accordingly, an increase in the likelihood of collisions is suppressed by increasing the percentage of drones 30 having the avoidance function when the overlapping flight airspace is small, while at the same time ensuring the effective usage of airspace by permitting even drones 30 that do not have the avoidance function to share the flight airspace.

2-4. Avoidance Function Priority Level

Although the presence/absence of the avoidance function is used to determine whether or not to permit sharing in the embodiment and the above-describe variations, the presence/absence of the avoidance function may be used to determine a priority level for the allocation. In the present variation, allocation rule storage unit 104 stores the following allocation rules in association with the travel type and the touring type, instead of storing the above-described allocation rules 1-3 and 2-2 (both of which are rules permitting the sharing of flight airspace only for drones 30 having the avoidance function).

<Travel Type Rule>

Allocation rule 1-6: the allocation of flight airspace is given a higher priority level for drones 30 that have the avoidance function than for drones 30 that do not have the avoidance function.

<Touring Type Rule>

Allocation rule 2-6: the allocation of flight airspace is given a higher priority level for drones 30 that have the avoidance function than for drones 30 that do not have the avoidance function.

According to allocation rules 1-1 and 2-1, flight airspace allocation unit 103 permits the sharing of flight airspace between travel type drones 30 and between touring type drones 30. However, in the present variation, it is assumed that the number of drones 30 that can share airspace is limited in accordance with the size of the overlapping flight airspace, in accordance with allocation rules 1-5 and 2-4 described in the foregoing variation. For example, if there are five drones 30 for which the travel airspace overlaps, and three drones 30 are permitted to share airspace on the basis of the size of the overlapping airspace, it is assumed that those three drones have the avoidance function.

Flight airspace allocation unit 103 permits the three drones having the avoidance function to share travel airspace with priority, revises the flight airspace for the remaining two drones, and allocates different flight airspace to the remaining two drones. In the above case, if two of the drones have the avoidance function, flight airspace allocation unit 103 gives priority to the one drone, of the remaining three drones, that has the earliest cell flight time in the overlapping airspace, for example, and permits that drone to share the travel airspace.

Additionally, in the above case, if four of the drones have the avoidance function, flight airspace allocation unit 103 gives priority to the three drones, of the four drones, that have the earliest cell flight times in the overlapping airspace, for example, and permits those drones to share the travel airspace. In the present variation, by increasing the priority level of allocation for drones 30 having the avoidance function in this manner, the likelihood of collisions is reduced as compared to a case where the flight airspace is permitted to be shared without considering the presence/absence of the avoidance function.

2-5. Common Airspace

Common airspace, which can be allocated to all flight types, may be provided. In the present variation, allocation rule storage unit 104 stores the following allocation rule without association with any flight type.

<Common Rule>

Allocation rule 4-1: common airspace, which can be allocated regardless of flight type, is allocated to drones regardless of the allocation rules for each flight type.

In accordance with allocation rule 4-1, flight airspace allocation unit 103 allocates the common airspace to drone 30 regardless of the flight type of drone 30.

FIG. 16 illustrates an example of common airspace. In the example of FIG. 16, flight airspace of a first altitude set for solo or shared allocation (solo/shared airspace D1), and common airspace D2 of a second altitude adjacent below (or above) the first altitude, are set as indicated in FIG. 16(*a*).

Flight airspace allocation unit 103 allocates common airspace D2 to drone 30 which, as a result of the allocation according to the above-described allocation rules, has a low priority level and is therefore allocated neither solo airspace nor shared airspace, for example. As a result, flight airspace can be allocated even for drone 30 which is not allocated flight airspace under the allocation rules associated with each of the flight types.

Additionally, flight airspace allocation unit 103 may allocate both solo/shared airspace D1 and common airspace D2 to drone 30. Assume that, for example, the priority level of a travel type drone 30, for which overlapping airspace is included in the tentatively-determined flight airspace, is low, and flight airspace allocation unit 103 therefore has not permitted the overlapping airspace to be shared. In this case, as indicated in FIG. 16(*b*), flight airspace allocation unit 103 allocates solo/shared airspace D1 that does not overlap up to the overlapping airspace as travel airspace, and causes the drone to move to common airspace D2 before that overlapping airspace.

Then, after the drone has flown through common airspace D2 along the overlapping airspace and has passed the overlapping airspace, flight airspace allocation unit 103 allocates airspace in which the drone returns to solo/shared airspace D1 and travels toward the destination as the travel airspace. By flight airspace allocation unit 103 allocating common airspace as airspace for avoiding the overlapping airspace, the flight distance of drones in the common airspace can be shortened, and the likelihood of collisions between drones can be reduced, while allocating solo/shared airspace to the greatest extent possible and using the airspace effectively.

In the solo/shared airspace, the number of drones 30 that shared the overlapping airspace is limited by the above-described allocation rules, but in the above-described common airspace, there is no such limit on the number of drones, and thus it is more likely that drones 30 will collide than in the solo/shared airspace. Accordingly, allocation rule storage unit 104 may store allocation rules such as those described below, which reduce the likelihood of collisions, as common rules.

<Common Rules>

Allocation rule 4-2: common airspace is allocated to a number of drones 30 based on the size of the common airspace (the volume of the space).

Allocation rule 4-3: common airspace is allocated only to drones 30 having the avoidance function.

Allocation rule 4-4: if a percentage of drones 30 based on the size of the common airspace have the avoidance function, the common airspace is allocated to those drones 30.

By allocating the common airspace according to allocation rule 4-2 or allocation rule 4-3, flight airspace allocation unit 103 can reduce the likelihood of collisions even in the common airspace, as compared to a case where the number of drones 30 to which the common airspace is allocated is not limited. Additionally, by allocating the common airspace according to allocation rule 4-4, flight airspace allocation unit 103 can ensure the effective use of airspace, as compared to a case where the common airspace is always only allocated to drones 30 having the avoidance function.

2-6. Recognizing Other Drones

Drone 30 may have a recognition function for recognizing other drones, and a self information emitting function for causing other drones to recognize that drone 30. The emitting function is a function in which, for example, drone 30 wirelessly emits a signal indicating self information pertaining to that drone 30 (e.g., the drone ID). The recognition function is a function through which drone 30 receives a signal emitted by another drone and reads the self information indicated by that signal.

When drones 30 having the recognition function and the emitting function approaches a range where radio waves reach, drones 30 can receive each others' self information and detect that another drone 30 is flying nearby. Other device measurement unit 307, described in the embodiment, uses the object recognition sensor to measure the distance and direction of another drone, and thus objects aside from drones 30, such as buildings or birds, are also recognized. In this case, if flight control unit 303 carries out a normal evasive maneuver according to a typical avoidance rule, it is possible that the risk of a collision will actually increase.

Accordingly, in the present variation, flight control unit 303 makes a normal evasive maneuver when the recognition function has detected that a partner is another drone 30 (a first evasive maneuver). Note that flight control unit 303 makes an evasive maneuver different from the normal evasive maneuver (a second evasive maneuver) if other device measurement unit 307 has measured the distance and direction to some object despite the recognition function not detecting that the partner is another drone 30.

It is desirable that the second evasive maneuver be a maneuver that increases the chance of avoiding a collision even if the partner is an obstacle that does not move, such as a building or a tree, an obstacle that does not move according to a common avoidance rule, such as a bird, and the like. Specifically, the second evasive maneuver is an evasive maneuver that, for example, avoid a collision with a non-moving obstacle by simply changing the flight direction to a direction moving away from the object, changes the direction of the movement away each time other device measurement unit 307 measures the direction of the object, and so on.

In this manner, by flight control unit 303 taking different evasive maneuvers depending on whether an object that has approached is drone 30 or another object (a building, a tree, a bird, or the like), it is easier to avoid a collision as compared to a case where the same evasive maneuver is always taken. Note that the self information is not limited to the drone ID, and may indicate, for example, the flight type of the host device, or, if the host device is a hovering type, the hovering position of the host device. Additionally, whether or not to emit self information having specific content may be used in the allocation rules as described below.

<Hovering Type Rules>

Allocation rule 3-5: when the flight airspace overlaps between hovering types, airspace is allocated with priority given to drone 30 having the emitting function for emitting self information indicating the hovering position.

Allocation rule 3-6: if the flight airspace overlaps with that of a touring type, the flight airspace is shared if the hovering type drone 30 has the emitting function for emitting self information indicating the hovering position and the touring type drone 30 has the recognition function.

By flight airspace allocation unit 103 allocating the hovering airspace according to allocation rule 3-5, hovering airspace can be allocated to drone 30 less likely to have a collision with another drone, as compared to a case where, for example, the airspace is simply allocated to drone 30 having an earlier start time for the estimated hovering period. Additionally, by flight airspace allocation unit 103 allocating the hovering airspace according to allocation rule 3-6, even if hovering type and touring type drones 30 are permitted to share flight airspace, the likelihood of the drones colliding with each other can be kept low, as compared to a case where the flight airspace is shared without taking the self information into consideration.

2-7. Parameters

The parameters used to determine the flight airspace are not limited to those described in the embodiment. For example, spatial coordinates indicating the boundaries of airspace to be flown or the cell IDs of the cells included in that airspace may be used as the parameters, regardless of the flight type. However, even in such cases, it is necessary for the location of the destination to be indicated by the parameters if drone 30 is the travel type.

Additionally, if drone 30 is the touring type, it is necessary for the range of the touring space to be indicated by the parameters. Furthermore, if drone 30 is the hovering type, it is necessary for the hovering position to be indicated by the parameters. In other words, any parameters may be used as long as the parameters express the destination for the travel type, the range of the touring space for the touring type, and the hovering position for the hovering type.

2-8. Flight Airspace Allocation Method

In the embodiment, flight airspace allocation unit 103 allocated the flight airspace by repeating tentative determinations, revisions, and finalizations, but the flight airspace may be allocated using a different method. For example, a method in which attributes specifying that airspace can be allocated only to drone 30 based on an allocation rule are defined in advance for one or more cells may be used.

For example, attributes specifying that airspace can be allocated only to drone 30 that is the travel type, flies facing east, and has the avoidance function is defined for 10 cells, from cells C01_01 to C10_01. Flight airspace allocation unit 103 stores the attributes of each cell, and if those cells are allocated only to drones 30 matching those attributes, the allocation will by necessity be based on allocation rules 1-1 to 1-4, making it unnecessary to revise the allocation as per the embodiment.

Likewise, attributes specifying that airspace can be allocated only to drones 30 of the touring type and that have the avoidance function are defined for a group of 100 cells forming a square, for example, from cells C50_50 to C60_60. If flight airspace allocation unit 103 allocates those cells only to drones 30 matching those attributes, the allocation will by necessity be based on allocation rules 2-1 to 2-3, making it unnecessary to revise the allocation.

Additionally, for example, flight schedule generation unit 201 of business operator terminal 20 may generate flight schedule information expressing the flight schedule using the cell IDs of cells included in a flight path desired by the operator. In this case, the flight path is already expressed by the flight schedule information, and flight airspace allocation unit 103 therefore need not tentatively determine the flight path. Flight airspace allocation unit 103 determines drones 30 for which overlapping airspace can/cannot be shared, and for which overlapping airspace is allocated with priority.

Additionally, flight airspace allocation unit 103 may carry out the allocation so that only official flight airspace is allocated based on the allocation rules from the beginning, and revision is therefore a necessary.

Flight airspace allocation unit 103 allocates flight airspace based on the allocation rules corresponding to the flight type of drones 30, in order from drone 30 that requested the allocation first, for example. Thus for drones 30 for which flight airspace could not be allocated for the time or period indicated by the flight schedule, flight airspace allocation unit 103 shifts the time or period and then allocates the flight airspace based on the allocation rules corresponding to the flight type again. In this manner, flight airspace allocation unit 103 may carry out the allocation according to any method, as long as the flight airspace can be allocated based on the allocation rules corresponding to the flight types of drones 30.

2-9. Flight Types

The flight types are not limited to the above-described three types (the travel type, the touring type, and the hovering type). For example, a patrolling type, which periodically moves among a plurality of hovering positions (e.g., hovering positions where a plurality of entrances to a venue can be monitored), may be used. The patrolling type is a type that combines the hovering type with the travel type, and although these flight types may be used in an alternating manner, the patrolling type may be used as a single flight type.

Additionally, a following type, which follows another drone 30 at a distance, may be used as well. The following type drone 30 may use the same flight type allocation rules as the partner drone 30 being followed, or may use a dedicated allocation rule for the following type. The dedicated allocation rule is, for example, that the number of following type drones 30 is not included in the number based on the size of the overlapping flight airspace specified in allocation rules 1-5 and 2-4. In sum, any flight types may be used as long as balance can be struck between reducing the likelihood of collisions between drones and effectively using airspace by using allocation rules based on the flight types.

2-10. Aircraft

Although the embodiment describes using a rotary wing-type aircraft as an aircraft that carries out autonomous flight, the aircraft is not limited thereto. For example, the aircraft may be a fixed-wing aircraft, or may be a helicopter-type aircraft. Additionally, autonomous flight functionality is not necessary, and for example, a radio-controlled (wirelessly-operated) aircraft, which is operated remotely by an operator, may be used, as long as the aircraft can fly in allocated flight airspace during in allocated permitted flight period.

2-11. Apparatuses Implementing Respective Units

The apparatuses implementing the respective functions illustrated in FIG. 5 may be different from those shown in FIG. 5. For example, the functions of server apparatus 10 (e.g., flight type determination unit 102) may be provided in business operator terminal 20, and the functions of business operator terminal 20 (e.g., flight schedule generation unit 201) may be provided in server apparatus 10. Additionally, each function of server apparatus 10 may be realized by two or more apparatuses. In sum, the drone operation management system may include any number of apparatuses as long as the functions of the drone operation management system as a whole are realized.

2-12. Category of the Invention

The present invention may be understood as information processing apparatuses, namely the server apparatus and business operator terminal 20, an aircraft, namely drone 30, as well as an information processing system, such as the drone operation management system including those apparatuses and the aircraft. The present invention can also be understood as an information processing method for implementing the processing executed by the respective apparatuses, as well as a program for causing a computer that controls the respective apparatuses to function. The program may be provided by being stored in a recording medium such as an optical disk or the like, or may be provided by being downloaded to a computer over a network such as the Internet and being installed so as to be usable on that computer.

2-13. Processing Sequences, etc.

The processing sequences, procedures, flowcharts, and the like of the embodiments described in the specification may be carried out in different orders as long as doing so does not create conflict. For example, the methods described in the specification present the elements of a variety of steps in an exemplary order, and the order is not limited to the specific order presented here.

2-14. Handling of Input/Output Information, etc.

Information and the like that has been input/output may be saved in a specific location (e.g., memory), or may be managed using a management table. The information and the like that has been input/output can be overwritten, updated, or added to. Information and the like that has been output may be deleted. Information and the like that has been input may be transmitted to other apparatuses.

2-15. Software

Regardless of whether software is referred to as software, firmware, middleware, microcode, hardware description language, or by another name, "software" should be interpreted broadly as meaning commands, command sets, code, code segments, program code, programs, sub programs, software modules, applications, software applications, software packages, routines, subroutines, objects, executable files, execution threads, sequences, functions, and so on.

Additionally, software, commands, and so on may be exchanged over a transmission medium. For example, when software is transmitted from a website, a server, or another remote source using hardwired technologies such as coaxial cable, fiber optic cable, twisted pair cabling, or digital subscriber line (DSL), and/or wireless technologies such as infrared light, radio waves, or microwaves, these hardwired technologies and/or wireless technologies are included in the definition of "transmission medium".

2-16. Information and Signals

The information, signals, and so on described in the specification may be realized using any of a variety of different techniques. For example, data, instructions, commands, information, signals, bits, symbols, chips, and so on that may be referred to throughout all of the foregoing descriptions may be realized by voltages, currents, electromagnetic waves, magnetic fields or magnetic particles, photo fields or photons, or any desired combination thereof.

2-17. Systems and Networks

The terms "system" and "network" used in the specification can be used interchangeably.

2-18. Meaning of "Based On"

The phrase "based on" used in the specification does not mean "based only on" unless specifically mentioned. In other words, the phrase "based on" means both "based only on" and "based at least on".

2-19. "And" and "Or"

In the specification, with respect to configurations that can be realized both as "A and B" and "A or B", a configuration described using one of these phrases may be used as a configuration described by the other of these phrases. For example, if the phrase "A and B" is used, "A or B" may be used as long as implementation is possible without conflicting with the other phrase.

2-20. Variations, etc. on Embodiments

The embodiments described in the specification may be used alone, may be combined, or may be switched according to how the invention is to be carried out. Additionally, notifications of predetermined information (e.g., a notification that "X is true") are not limited to explicit notifications, and may be carried out implicitly (e.g., the notification of the predetermined information is not carried out).

Although the foregoing has described the present invention in detail, it will be clear to one skilled in the art that the present invention is not intended to be limited to the embodiments described in the specification. The present invention may be carried out in modified and altered forms without departing from the essential spirit and scope of the present invention set forth in the appended scope of patent claims. As such, the descriptions in the specification are provided for descriptive purposes only, and are not intended to limit the present invention in any way.

REFERENCE SIGNS LIST

1 . . . Drone operation management system
10 . . . Server apparatus
20 . . . Business operator terminal
30 . . . Drone
101 . . . Flight schedule obtainment unit
102 . . . Flight type determination unit
103 . . . Flight airspace allocation unit
104 . . . Allocation rule storage unit
105 . . . Allocation information transmission unit
201 . . . Flight schedule generation unit
202 . . . Flight schedule transmission unit
203 . . . Allocation information obtainment unit
204 . . . Flight control information generation unit
205 . . . Flight control information transmission unit
301 . . . Flight control information obtainment unit
302 . . . Flight unit
303 . . . Flight control unit
304 . . . Position measurement unit
305 . . . Altitude measurement unit
306 . . . Direction measurement unit
307 . . . Other device measurement unit

What is claimed is:

1. An aircraft operation system comprising:
a storage medium configured to:
store a plurality of allocation rules for a flight airspace associated with each of a plurality of flight types associated with a respective aircraft, each of the plurality of the flight types having different parameters used to determine allocation of the flight airspace, the plurality of flight types including a travel type using a destination as the parameter, a hovering type using a position in space as the parameter and a touring type using a range in space as the parameter;
wherein a first allocation rule does not permit the flight airspace to be shared between respective aircrafts having different flight types;
wherein a second allocation rule permits the flight airspace to be shared between respective aircrafts of the travel type, for which flight airspaces overlap, when the respective aircrafts of the travel type fly in the same direction and include a function for recognizing another aircraft and avoiding a collision;
wherein a third allocation rule permits the flight airspace to be shared between respective aircrafts of the touring type, when the respective aircrafts of the touring type include a function for recognizing another aircraft and avoiding a collision;
wherein a fourth allocation rule does not permit the flight airspace to be shared between respective aircrafts of the hovering type;
a processor configured to:
obtain the parameters requested for each respective aircraft;
allocate the flight airspace based on the plurality of allocation rules associated with the flight type of each respective aircraft indicated by the parameter obtained for the aircraft by:
allocating, provisionally to an aircraft of the travel type, an airspace on a flight path from a departure point to a destination;
allocating, provisionally to an aircraft of the touring type, all airspace in a touring range;
allocating, provisionally to an aircraft of the hovering type, an airspace including a location of a hovering airspace; and
allocating the respective provisionally allocated airspaces to each of a plurality of aircrafts when airspaces provisionally allocated for different aircrafts overlap, when the allocation rules associated with flight types of the different aircrafts permit the provisionally allocated airspaces to be shared between the different aircrafts;
allocating the respective provisionally allocated airspace to an aircraft of a high priority flight type, and another flight airspace different from the provisionally allocated airspace to an aircraft of a low priority flight type, when the airspaces provisionally allocated for respective aircrafts overlap and the allocation rules do not permit the provisionally allocated airspaces to be shared between the respective aircrafts;
wherein the travel type has a first flight priority, the hovering type has a second flight priority greater than the first flight priority of travel type, and the touring type has a third flight priority greater than both the first flight priority of the travel type and the second flight priority of the hovering type; and
generate and transmit flight instructions for each respective aircraft to fly in the allocated airspace; and
an operator terminal configured to:
receive the flight instructions of a respective aircraft from the processor;
generate flight information based on the received flight instructions, and
control the flight of the respective aircraft in accordance with the flight information.

2. The aircraft operation system according to claim 1, wherein a fifth allocation rule permits overlapping flight airspace to be shared between the respective aircraft of the traveling type and the respective aircraft of the touring type based on the size of the overlapping flight airspace.

3. The aircraft operation system according to claim 1, wherein a sixth allocation rule permits the flight airspace to be shared if a percentage of aircraft based on a size of the flight airspace has a function for recognizing another aircraft and avoiding a collision is associated with the touring type as the allocation rule.

4. The aircraft operation system according to claim 1, wherein a seventh allocation rule sets a flight airspace allocation priority level higher for an aircraft having a function for recognizing another aircraft and avoiding a collision than for an aircraft not having the function is associated with the travel type and the touring type as the allocation rule.

5. The aircraft operation system according to claim 1, wherein the processor is further configured to allocate common airspace, which can be allocated regardless of the flight type, to the aircraft regardless of the allocation rule.

6. The aircraft operation system according to claim 5, wherein the processor is further configured to allocate the common airspace only to an aircraft having a function for recognizing another aircraft and avoiding a collision.

7. The aircraft operation system according to claim 1, wherein the aircraft includes an unmanned drone.

8. The aircraft operation system according to claim 1, wherein the operator terminal is configured to:
 generate flight schedules for at least one respective aircraft through operations made by operators; and
 transmit the schedule to the processor; and
 wherein the schedule includes the parameter used to determine allocation of the flight airspace for the aircraft.

* * * * *